United States Patent
Sriram et al.

(10) Patent No.: US 12,200,648 B2
(45) Date of Patent: Jan. 14, 2025

(54) OVER-THE-AIR TIMING ALIGNMENT COMPENSATION IN A DISTRIBUTED RADIO ACCESS NETWORK

(71) Applicant: CommScope Technologies LLC, Hickory, NC (US)

(72) Inventors: Suresh N. Sriram, Bangalore (IN); Sudarshana Varadappa, Bangalore (IN)

(73) Assignee: CommScope Technologies LLC, Claremont, NC (US)

( * ) Notice: Subject to any disclaimer, the term of this patent is extended or adjusted under 35 U.S.C. 154(b) by 109 days.

(21) Appl. No.: 17/791,278

(22) PCT Filed: Dec. 21, 2020

(86) PCT No.: PCT/US2020/066364
§ 371 (c)(1),
(2) Date: Jul. 7, 2022

(87) PCT Pub. No.: WO2021/146032
PCT Pub. Date: Jul. 22, 2021

(65) Prior Publication Data
US 2023/0354232 A1  Nov. 2, 2023

Related U.S. Application Data
(60) Provisional application No. 62/960,601, filed on Jan. 13, 2020.

(51) Int. Cl.
*H04W 56/00* (2009.01)
*H04W 84/04* (2009.01)
*H04W 88/08* (2009.01)

(52) U.S. Cl.
CPC ...... *H04W 56/0045* (2013.01); *H04W 84/042* (2013.01); *H04W 88/085* (2013.01)

(58) Field of Classification Search
CPC .......... H04W 56/0045; H04W 56/002; H04W 56/0065; H04W 56/0015; H04W 56/0085; H04W 88/0085
See application file for complete search history.

(56) References Cited

U.S. PATENT DOCUMENTS

| 6,674,730 B1 | 1/2004 | Moerder |
| 2014/0219255 A1 | 8/2014 | Eyuboglu et al. |

(Continued)

FOREIGN PATENT DOCUMENTS

| KR | 20170050361 A | 5/2017 |
| WO | 2004030241 A1 | 4/2004 |
| WO | 2021146032 A1 | 7/2021 |

OTHER PUBLICATIONS

European Patent Office, "Extended European Search Report", from EP Application No. 20913792.6, from Foreign Counterpart to U.S. Appl. No. 17/791,278, filed Nov. 23, 2023, pp. 1 through 11, Published: EP.

(Continued)

*Primary Examiner* — Jianye Wu
(74) *Attorney, Agent, or Firm* — Fogg & Powers LLC

(57) ABSTRACT

A distributed radio access network (RAN) includes a plurality of remote units (RUs) communicatively coupled to a centralized unit. During each of at least one measurement iteration: one of the plurality of RUs is selected as a transmit-mode RU and all other of the plurality of RUs are in receive-mode; the transmit mode-RU transmits a known pattern signal to the receive-mode RUs; and each receive-mode RU determines a frame or symbol boundary difference between when the transmit-mode RU transmitted the known pattern signal and when the respective receive-mode RU received the known pattern signal. Following the at least one measurement iteration: the centralized unit determines a respective timing offset based on each frame or symbol (Continued)

boundary difference; the centralized unit determines a common alignment point for the RUs based on the timing offsets; and each RU's timing is adjusted to align with the common alignment point.

26 Claims, 13 Drawing Sheets

(56) References Cited

U.S. PATENT DOCUMENTS

| | | | | |
|---|---|---|---|---|
| 2014/0241157 A1* | 8/2014 | Tan | ................... | H04W 56/001 370/336 |
| 2015/0351701 A1* | 12/2015 | Moxon | ............... | A61B 5/7282 607/45 |
| 2019/0116568 A1* | 4/2019 | Fertonani | .......... | H04W 56/0045 |
| 2019/0190635 A1 | 6/2019 | Goel et al. | | |

OTHER PUBLICATIONS

International Searching Authority, "International Search Report and Written Opinion from PCT Application No. PCT/US2020/066364 dated Mar. 15, 2021", pp. 1 through 10, Published in: KR.

* cited by examiner

OVER-THE-AIR TIMING ALIGNMENT COMPENSATION IN A DISTRIBUTED RADIO ACCESS NETWORK

CROSS-REFERENCE TO RELATED APPLICATIONS

This application claims priority to International Patent Application No. PCT/US2020/066364 filed on Dec. 21, 2020, entitled "OVER-THE-AIR TIMING ALIGNMENT COMPENSATION IN A DISTRIBUTED RADIO ACCESS NETWORK", which claims the benefit of U.S. Provisional Patent Application Ser. No. 62/960,601 filed on Jan. 13, 2020, entitled "OVER-THE-AIR TIMING ALIGNMENT COMPENSATION IN A DISTRIBUTED RADIO ACCESS NETWORK", which applications are incorporated herein by reference.

BACKGROUND

In a distributed radio access network (RAN), geographically-separate remote units are controlled by a centralized unit and provide wireless service to user equipment (UEs). However, timing offsets can be introduced in the remote units due to each one deriving its timing independently without coordinating with each other. It is desirable to perform over-the-air timing alignment compensation in a distributed RAN.

SUMMARY

A distributed radio access network (RAN) includes a plurality of remote units (RUs) communicatively coupled to a central unit. During each of at least one measurement iteration: one of the plurality of RUs is selected as a transmit-mode RU and all other of the plurality of RUs are in receive-mode; the transmit mode-RU transmits a known pattern signal to the receive-mode RUs; and each receive-mode RU determines a frame or symbol boundary difference between when the transmit-mode RU transmitted the known pattern signal and when the respective receive-mode RU received the known pattern signal. Following the at least one measurement iteration: the central unit determines a respective timing offset based on each frame or symbol boundary difference; the central unit determines a common alignment point for the RUs based on the timing offsets; and each RU's timing is adjusted to align with the common alignment point.

DRAWINGS

Understanding that the drawings depict only exemplary configurations and are not therefore to be considered limiting in scope, the exemplary configurations will be described with additional specificity and detail through the use of the accompanying drawings, in which.

In accordance with common practice, the various described features are not drawn to scale but are drawn to emphasize specific features relevant to the exemplary configurations.

DETAILED DESCRIPTION

There are different types of distributed RANs including, without limitation, a cloud radio access network (C-RAN) and a distributed antenna system (DAS). Either type of distributed RAN may implement an LTE, 5G air interface, and/or any other suitable air interface. Typically, for each cell implemented by a distributed RAN, a central unit (e.g., a DU or baseband controller) communicates with at least one (and typically more than one) remote unit (RU, also called radio unit) via Common Public Radio Interface (CPRI), Extended Common Public Radio Interface (EC-PRI), Ethernet, Radio over Ethernet (RoE), or wireless radio frequency (RF) connectivity. The RUs are distributed across a coverage area to serve user equipment (UEs), where each UE is served from one or more RUs. When a UE receives a signal from two RUs with ideal phase/timing offset, the signals adds up constructively and boosts the signal quality. However, clocks in the RUs may drift from master timing (and from each other), e.g., due to different temperature-dependent effects and non-linearities of oscillators. This time drift across two RUs will introduce multi-path effects that cause the received signals to destructively combine at the UE and bring down the signal quality.

The present systems and methods may improve the signal quality of UE reception by compensating for the timing offsets in the RUs of a distributed RAN. Specifically, the present systems and methods may estimate a timing offset error (TOE) of each radio unit (RU) over the air (OTA) and calculate a common alignment point (CAP) value for all RUs. The timing adjustment applied at each RU may vary with respect to the common timing because each RU's TOE may vary, where the TOE is a measure of deviation between an RU's antenna port timing against another clock (e.g., a global reference clock). The global reference clock could be (1) a DU or CU in 5G (or a baseband controller in 4G) acting as a timing master; or a Global Positioning System (GPS), Network Time Protocol (NTP) computing device, or Precision Time Protocol (PTP) computing device as source.

Example 4G C-RAN

Figure 1A:
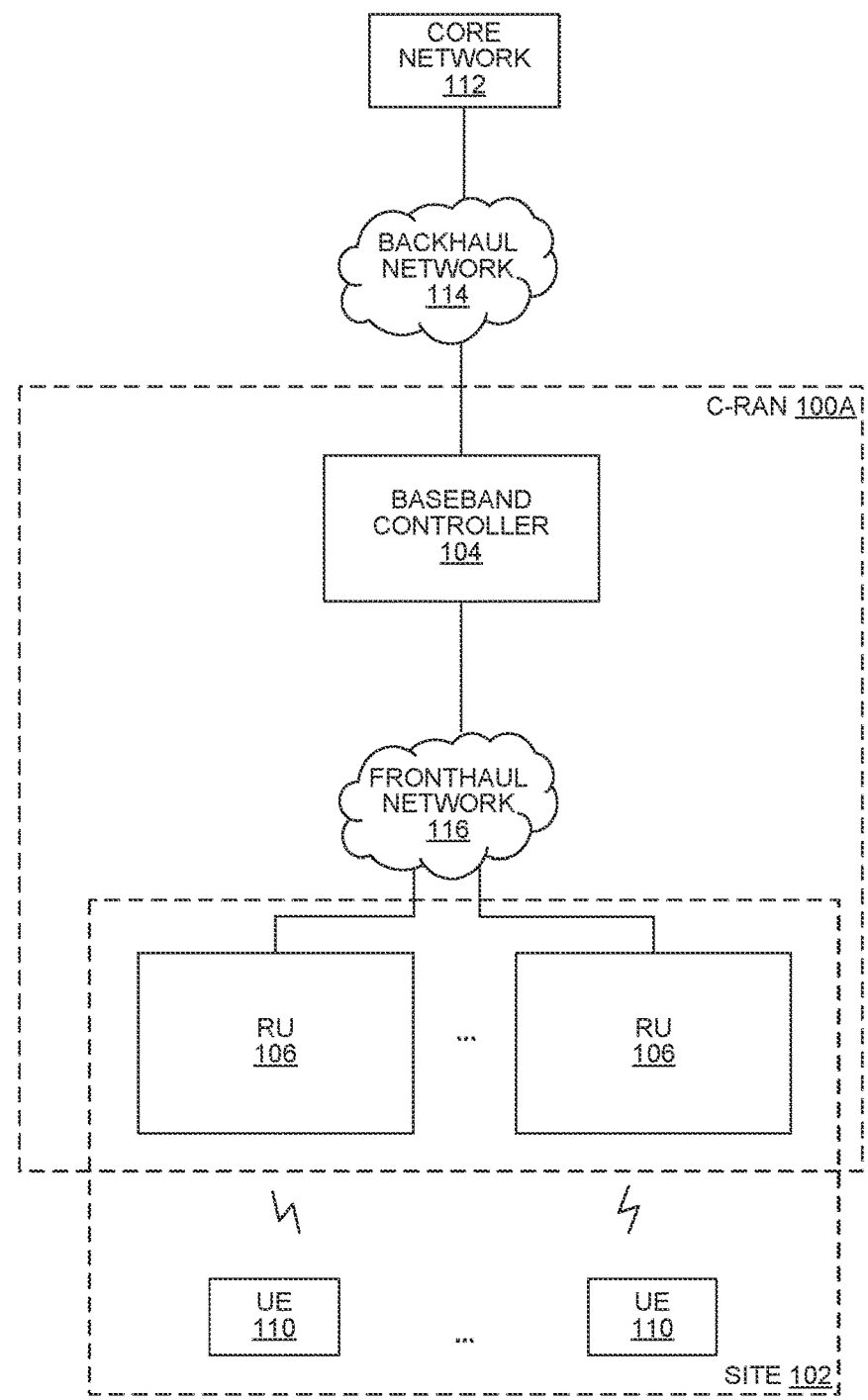
FIG. 1A is a block diagram illustrating an exemplary configuration of a communication system that includes 3GPP Fourth Generation (4G) components.

FIG. 1A is a block diagram illustrating an exemplary configuration of a communication system 100A that includes 3GPP Fourth Generation (4G) components. In the exemplary configuration shown in FIG. 1A, the system 100A is implemented using the cloud radio access network (C-RAN) (point-to-multipoint distributed base station) architecture that employs at least one baseband unit 104 and one or more remote units (RUs) 106, also referred to as "radio units" or "radio points", that serve at least one cell.

The RUs 106 may be deployed at a site 102 to provide wireless coverage and capacity for one or more wireless network operators. The site 102 may be, for example, a building or campus or other grouping of buildings (used, for example, by one or more businesses, governments, other enterprise entities) or some other public venue (such as a hotel, resort, amusement park, hospital, shopping center, airport, university campus, arena, or an outdoor area such as a ski area, stadium or a densely-populated downtown area). In some configurations, the site 102 is at least partially (and optionally entirely) indoors, but other alternatives are possible.

The system 100A may also be referred to here as a "C-RAN" or a "C-RAN system." The baseband unit 104 is one type of central unit, and is also referred to here as "baseband controller" 104, or just "controller" 104. Each radio unit (RU) 106 may include or be coupled to at least one antenna used to radiate downlink RF signals to user equipment (UEs) 110 and receive uplink RF signals transmitted by UEs 110. The baseband controller 104 may optionally be physically located remotely from the site 102, e.g., in a centralized bank of baseband controllers 104. Additionally, the RUs 106 may be physically separated from each other within the site 102, although they are each communicatively coupled to the baseband controller 104 via a fronthaul network 116.

Each UE 110 may be a computing device with at least one processor that executes instructions stored in memory, e.g., a mobile phone, tablet computer, mobile media device, mobile gaming device, laptop computer, vehicle-based computer, a desktop computer, etc. Each baseband controller 104 and RU 106 may be a computing device with at least one processor that executes instructions stored in memory. Furthermore, each RU 106 may optionally implement one or more instances (e.g., modules) of a radio unit 106.

The C-RAN 100A may optionally implement frequency reuse where the same frequency resource(s) are used for multiple sets of UEs 110, each set of UEs 110 being under a different, geographically diverse set of RUs 106.

The system 100A is coupled to a core network 112 of each wireless network operator over an appropriate backhaul network 114. For example, the Internet may be used for backhaul between the system 100A and each core network 112. However, it is understood that the backhaul network 114 can be implemented in other ways. Each of the backhaul network 114 and/or the fronthaul network 116 described herein may be implemented with one or more switches, routers, and/or other networking devices, e.g., the backhaul network 114 and/or the fronthaul network 116 may be implemented with a switched ETHERNET network.

The system 100A may be implemented as a Long Term Evolution (LTE) radio access network providing wireless service using an LTE air interface. LTE is a standard developed by the 3GPP standards organization. In this configuration, the baseband controller 104 and RUs 106 together are used to implement an LTE Evolved Node B (also referred to here as an "eNodeB" or "eNB"). An eNB may be used to provide UEs 110 with mobile access to the wireless network operator's core network 112 to enable UEs 110 to wirelessly communicate data and voice (using, for example, Voice over LTE (VoLTE) technology). However, it should be noted that the present systems and methods may be used with other wireless protocols, e.g., the system 100A may be implemented as a 3GPP 5G RAN providing wireless service using a 5G air interface, as described below.

Also, in an exemplary LTE configuration, each core network 112 may be implemented as an Evolved Packet Core (EPC) 112 comprising standard LTE EPC network elements such as, for example, a mobility management entity (MME) and a Serving Gateway (SGW) and, optionally, a Home eNB gateway (HeNB GW) (not shown) and a Security Gateway (SeGW or SecGW) (not shown).

Moreover, in an exemplary LTE configuration, each baseband controller 104 may communicate with the MME and SGW in the EPC core network 112 using the LTE S1 interface and communicates with eNBs using the LTE X2 interface. For example, the baseband controller 104 can communicate with an outdoor macro eNB (not shown) via the LTE X2 interface.

Each baseband controller 104 and remote unit 106 can be implemented so as to use an air interface that supports one or more of frequency-division duplexing (FDD) and/or time-division duplexing (TDD). Also, the baseband controller 104 and the remote units 106 can be implemented to use an air interface that supports one or more of the multiple-input-multiple-output (MIMO), single-input-single-output (SISO), single-input-multiple-output (SIMO), and/or beam forming schemes. For example, the baseband controller 104 and the remote units 106 can implement one or more of the LTE transmission modes. Moreover, the baseband controller 104 and the remote units 106 can be configured to support multiple air interfaces and/or to support multiple wireless operators.

In some configurations, in-phase, quadrature-phase (I/Q) data representing pre-processed baseband symbols for the air interface is communicated between the baseband controller 104 and the RUs 106. Communicating such baseband I/Q data typically requires a relatively high data rate front haul.

In some configurations, a baseband signal can be pre-processed at a source RU 106 and converted to frequency domain signals (after removing guard band/cyclic prefix data, etc.) in order to effectively manage the fronthaul rates, before being sent to the baseband controller 104. The RU 106 can further reduce the data rates by quantizing such frequency domain signals and reducing the number of bits used to carry such signals and sending the data. In a further simplification, certain symbol data/channel data may be fully processed in the source RU 106 itself and only the resultant information is passed to the baseband controller 104.

The Third Generation Partnership Project (3GPP) has adopted a layered model for the LTE radio access interface. Generally, some combination of the baseband controller 104 and RUs 106 perform analog radio frequency (RF) functions for the air interface as well as digital Layer 1 (L1), Layer 2 (L2), and Layer 3 (L3) (of the 3GPP-defined LTE radio access interface protocol) functions for the air interface. Any suitable split of L1-L3 processing (between the baseband controller 104 and RUs 106) may be implemented. Where baseband signal I/Q data is fronthauled between the baseband controller 104 and the RUs 106, each baseband controller 104 can be configured to perform all or some of the digital L1, L2, and L3 processing for the air interface. In this case, the L1 functions in each RU 106 is configured to implement all or some of the digital L1 processing for the air interface.

Where the fronthaul ETHERNET network 116 is not able to deliver the data rate need to front haul (uncompressed) I/Q data, the I/Q data can be compressed prior to being communicated over the ETHERNET network 116, thereby reducing the data rate needed communicate such I/Q data over the ETHERNET network 116.

Data can be fronthauled between the baseband controller 104 and RUs 106 in other ways (for example, using fronthaul interfaces and techniques specified in the Common Public Radio Interface (CPRI) and/or Open Base Station Architecture Initiative (OBSAI) family of specifications). Accordingly, the baseband controller 104 described herein may be similar to and/or perform at least some of the functionality of the O-RAN Distributed Unit (O-DU).

Example 5G C-RANs

Figure 1B:
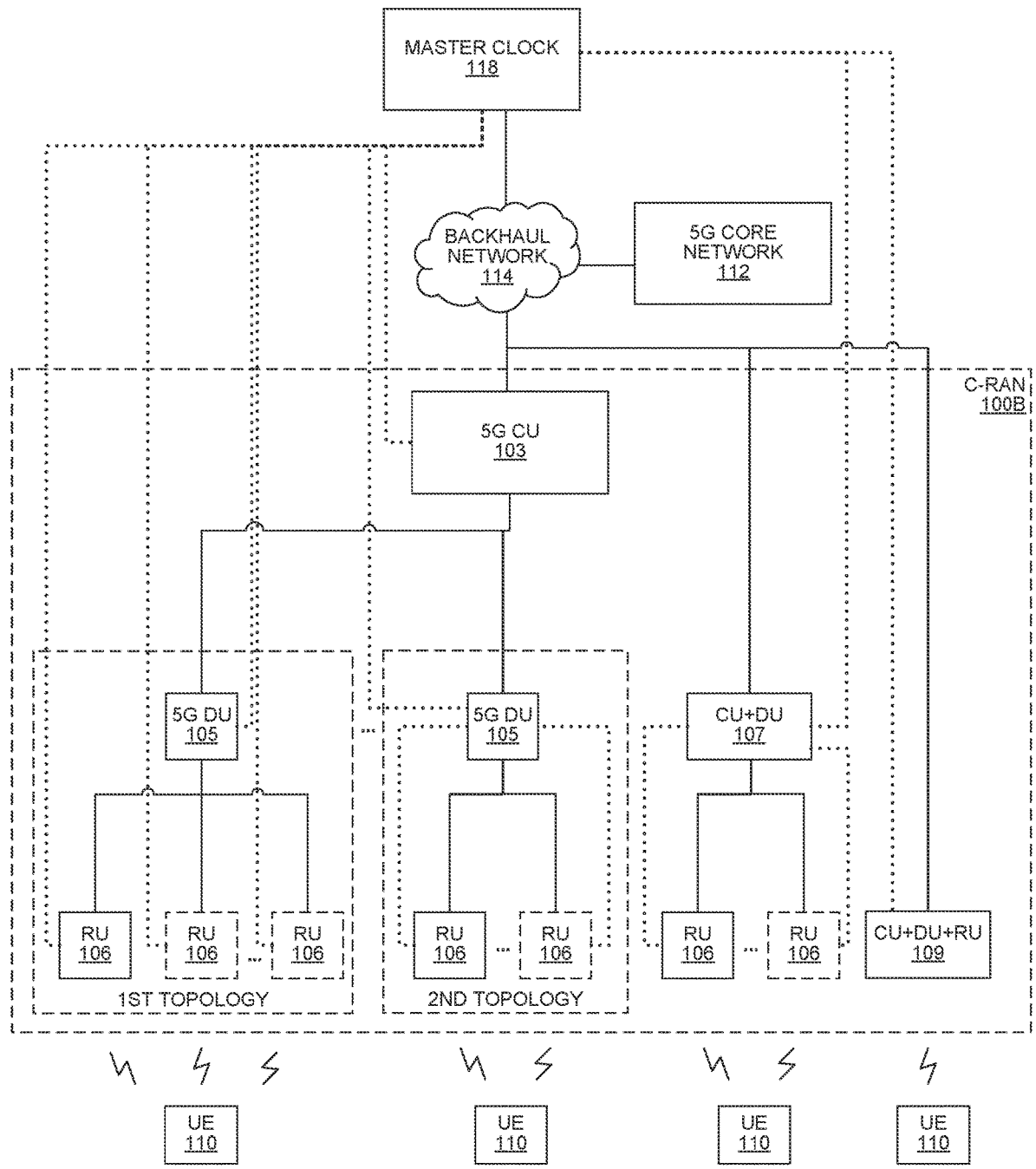
FIG. 1B is a block diagram illustrating an exemplary configuration of a communication system that includes 3GPP Fifth Generation (5G) components.

FIG. 1B is a block diagram illustrating an exemplary configuration of a C-RAN 100B that includes 3GPP Fifth Generation (5G) components. Optionally, the C-RAN 100B may additionally include 4G components. Each of the components in the C-RAN 100B may be implemented using at least one processor executing instructions stored in at least one memory. In some configurations, at least some of the components are implemented using a virtual machine.

FIG. 1B illustrates a C-RAN 100B implementing an example of a 5G Next Generation NodeB (gNB). The architecture of a Next Generation NodeB (gNB) is partitioned into a 5G Central Unit (CU) 103, one or more 5G Distributed Unit (DU) 105 and one or more 5G Remote Units (RU) 106. A 5G Central Unit (CU) 103 is a node that includes the gNB controller functions such as the transfer of user data, mobility control, radio access network sharing, positioning, session management, etc.

The Distributed Units (DUs) 105 may be nodes that implement a subset of the gNB functions, depending on the functional split (between CU 103 and DU 105). In some configurations, the L3 processing (of the 5G air interface) may be implemented in the 5G CU 103 and the L2 processing (of the 5G air interface) may be implemented in the DU 105. The operation of each DU 105 is controlled by a 5G CU 103. The DU 105 is one type of central unit, which may perform Radio Link Control (RLC), portions of Medium Access Control (MAC) and/or portions of the physical (PHY) layer functions. A Distributed Unit (DU) 105 can optionally offload some of its PHY (L1) processing (of the 5G air interface) to RUs 106.

In some configurations, the functionality of a CU 103 and a DU 105 may be implemented in a combined CU/DU 107. Similarly, in some configurations, the functionality of a 5G CU 103, a DU 105, and an RU 109 may be implemented in a combined CU/DU/RU 109.

In some 5G configurations, the RUs 106 may communicate baseband signal data to the DUs 105. In some 5G configurations, the RUs 106 may implement at least some of the L1 and/or L2 processing.

Fifth Generation (5G) standards support a wide variety of applications, bandwidth, and latencies while supporting various implementation options. In some configurations, the 5G CU 103 controls the operation of the Distributed Units (DUs) 105 over an interface, e.g., F1-c and F1-u for the control plane and user plane, respectively. In some configurations, the 5G CU 103 may communicate with at least one wireless service provider's 5G core network 112, e.g., using 5G NGc and 5G NGu interfaces. In some configurations, the DUs 105 may communicate with the RUs on an NG-iq interface.

The RUs 106 derive their timing from an external timing source. In some configurations, the external source is a master clock 118, e.g., derived from Global Positioning System (GPS), Network Time Protocol (NTP), Precision Time Protocol (PTP), or Synchronous Ethernet (SyncE). Alternatively, a DU 105 can act as the timing source for an RU 106. In some configurations, the RUs 106 must maintain a Timing offset error (TOE) at its antenna port within a threshold time, e.g., +/−3 microseconds from the master clock 118. In a distributed RAN (e.g., C-RAN 100) implementing multiple cells, a high TOE causes signal degradation on cell-edges in frequency-reuse deployments. However, in a distributed RAN (e.g., C-RAN 100) implementing a single serving cell, performance may also suffer as a result of signals from different RUs 106 combining destructively at a UE 110.

In a C-RAN 100, the RUs transmit to UEs 110 via simulcast or unicast transmission. During simulcast transmissions, the UE 110 experiences strong multi-path components without gain reduction. During unicast transmissions, the UE 110 sees interference from adjacent RUs 106 transmitting the un-intended signal due to signal leakage. The degradation is exponential with the number of RUs 106 or MIMO transmissions to the UE 110. Typical indoor or distributed MIMO antennas have a higher probability of multiple RUs 106 serving a UE 110.

The degradation of UE 110 signal reception is based on two factors: (1) the number of RUs 106 serving one UE 110; and (2) the timing offset error (TOE) across the RUs 106 for the serving UE 110. As used herein, the TOE (Δ, also referred to as "timing offset") refers to the timing difference between RUs 106 or their antennas, e.g., due to clock drift. In other words the TOE (or timing offset) indicates an amount of time that two clocks (e.g., between RUs 106, between an RU 106 and a master clock, etc.) have drifted from each other.

In a first example topology in FIG. 1B, the RUs 106 and the DU 105 derive their timing from (synchronize their clocks to) an external master clock 118 shown by the dotted lines, e.g., the external master clock 118 may be based on GPS, NTP, PTP, SyncE, etc. In the second example topology of FIG. 1B, the RUs 106 derive their timing from the serving DU 105, and the DU 105 derives its timing from the external master clock. In both topologies, the RUs 106 derive their timing independently. As stated above, it is desirable for the RUs 106 to maintain the same timing within a certain threshold, e.g., within +/−3 microseconds. When multiple RUs 106 are serving a single UE 110 or the UE 110 is positioned in middle of multiple RUs 106, the TOE impacts the reception (and throughput).

Distributed Antenna System (DAS)

Figure 1C:
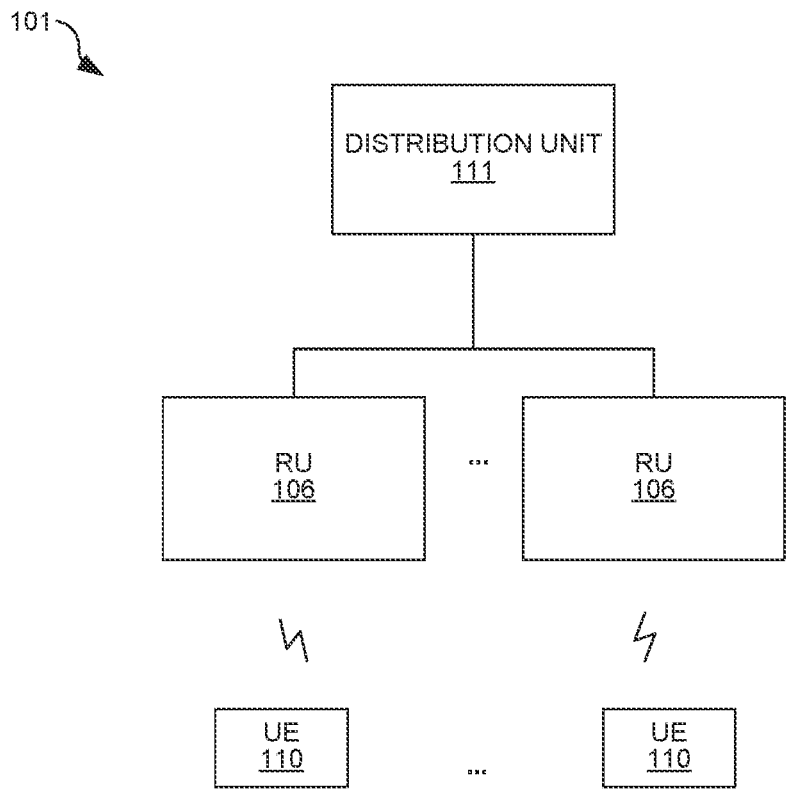
FIG. 1C is a block diagram illustrating an example distributed antenna system (DAS)

FIG. 1C is a block diagram illustrating an example distributed antenna system (DAS) 101. The example DAS 101 includes at least two RUs 106 and a centralized distribution unit 111. The RUs 106 can wirelessly transmit signals to UEs 110 in a coverage area. The distribution unit 111 can communicate channelized digital baseband signals with the RUs 106. The channelized digital baseband signals may include call information for wireless communication. It is understood that the DAS 101 may implement additional devices and/or functionality.

The DAS 101 may implement any suitable air interface, e.g., Third Generation Partnership Project (3GPP) 3G, 4G, and/or 5G air interface(s). The distribution unit 111 is one type of central unit. Additionally, the RUs 106 in a DAS 101 may implement similar and/or different functionality than the RUs 106 in a C-RAN 100.

Multipath

Figure 2:
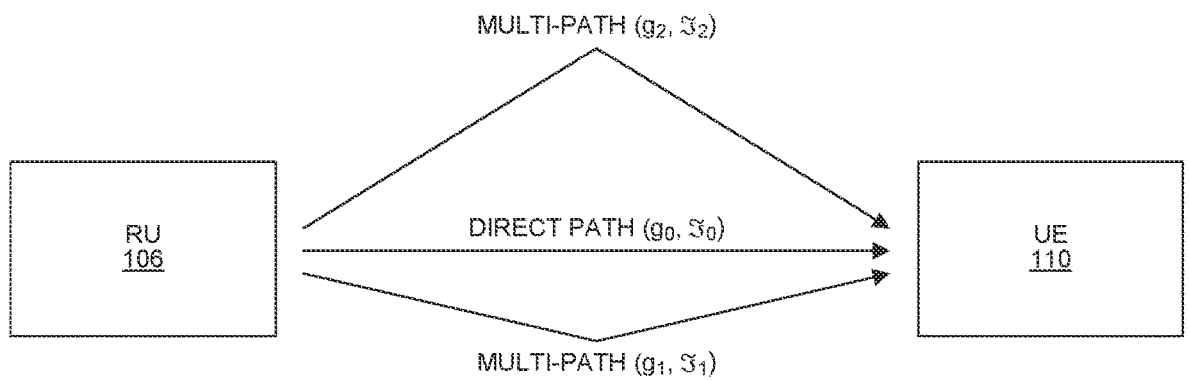
FIG. 2 is a block diagram illustrating the gain (g) and propagation delay ($\Im$) of three different paths of a transmission from an RU to a UE.

FIG. 2 is a block diagram illustrating three different paths of a transmission from an RU 106 to a UE 110. In real-world propagation environments, a multi-path transmission will have gain and timing differences across the paths due to the signal travelling different paths. Specifically, FIG. 2 illustrates the gain (g) and propagation delay ($\Im$) of two multi-paths and one direct path that a downlink transmission from the RU 106 can take to the UE 110. Typically, the gain (g) will be higher and the propagation delay ($\Im$) lower in the direct path than in a multipath based on the distances travelled. For example, $g_0 > g_1 > g_2$ and $\Im_0 < \Im_1 < \Im_2$ for the transmission paths in FIG. 2.

Propagation Model

Figure 3:
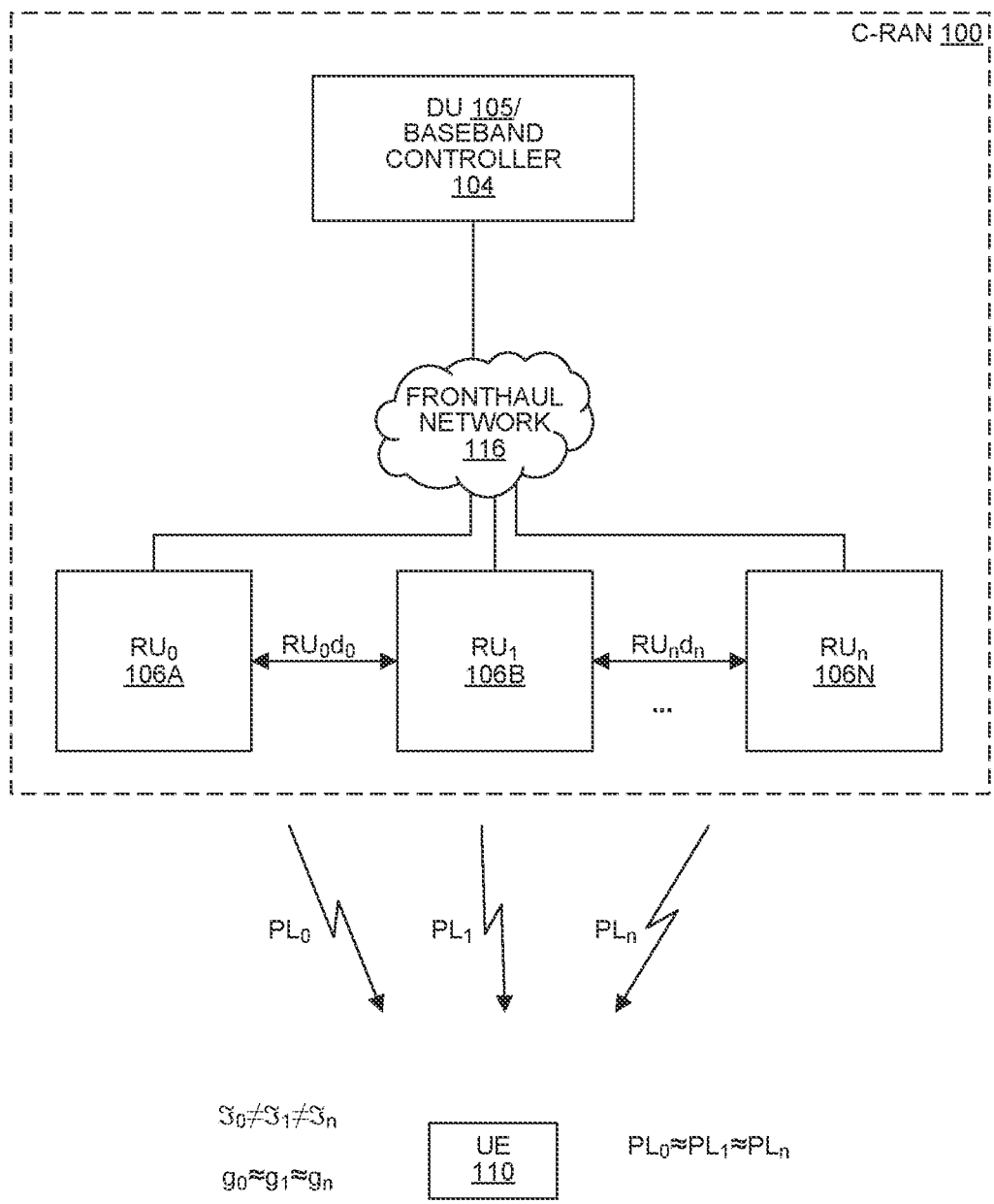
FIG. 3 is a block diagram illustrating an example downlink propagation model in a C-RAN.

FIG. 3 is a block diagram illustrating an example downlink propagation model in a C-RAN 100. It should be noted that the C-RAN 100 of FIG. 3 may have additional elements not shown, e.g., a 5G CU 103. FIG. 3 illustrates n different RUs 106A-N transmitting to a single UE 110, where n. A C-RAN 100 typically covers around 10s of meters for better coverage and capacity. The probability of UE 110 served by multiple RUs 106 is above 80 percent.

In the example downlink propagation model illustrated in FIG. 3, the path loss ($PL_n$) and propagation delay ($\Im_n$) from serving RUs 106 are approximately equal, i.e., $PL_0 \approx PL_1 \approx PL_n$ and $\Im_0 \approx \Im_1 \approx \Im_n$. Even though the propagation delay ($\Im_n$) from each individual RU 106 to the UE 110 is approximately equal, the timing offset error (TOE) introduced by each of the RU 106 impacts the time of arrival ($\Im_y$) at the UE 110 according to the following relationship: $\Im_y = (\Im_n + \Delta_n)$ where $\Delta_n$ is the TOE (introduced from the drift of the transmitting RU's clock). When the TOE is introduced, over approximately equal propagation delays, it can cause strong multi-path effects when the UE 110 receives the signal from different RUs 106 because the different received signals will not have much gain reduction. These multi-path effects can cause system degradation (e.g., lower throughput from a high symbol error rate) because the different signals may be processed as direct path signals since they are received with approximately equal gain.

Figure 4:
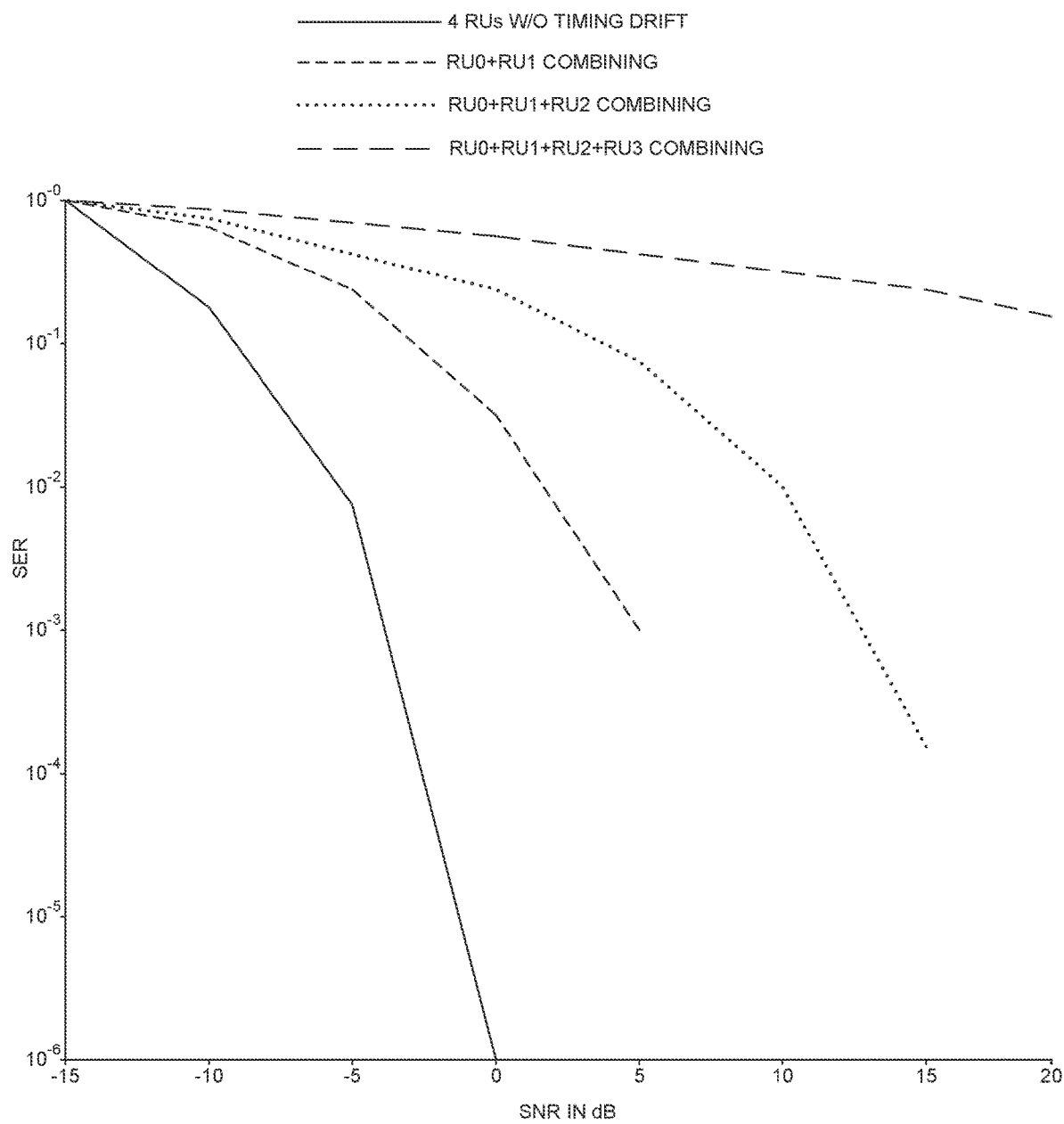
FIG. 4 is a plot illustrating symbol error rates caused by different timing offset errors (TOEs) of RUs serving a single UE.

FIG. 4 is a plot illustrating symbol error rates caused by different timing offset errors (TOEs) of RUs 106 serving a single UE 110. In other words, FIG. 4 illustrates downlink system performance for a distributed RAN (e.g., C-RAN 100) with four RUs 106 (n=4).

For example, FIG. 4 illustrates the Symbol Error Rate caused by a TOE across the different RUs 106 serving a single UE 110. The plot compares three different TOE scenarios against a zero-TOE scenario. The TOE scenarios assume a non-zero TOE between the RUs 106 serving the UE 110. The plot shows that a higher TOE causes a higher Symbol Error Rate (SER) and worse signal-to-noise ratio (SNR). Furthermore, the problems of a high TOE are exacerbated when a higher number of RUs 106 transmit to a single UE 110 (showing worse performance in the three- and four-RU 106 scenarios than in the two-RU 106 scenario).

Compensating for Timing Offset Errors

Figure 5:
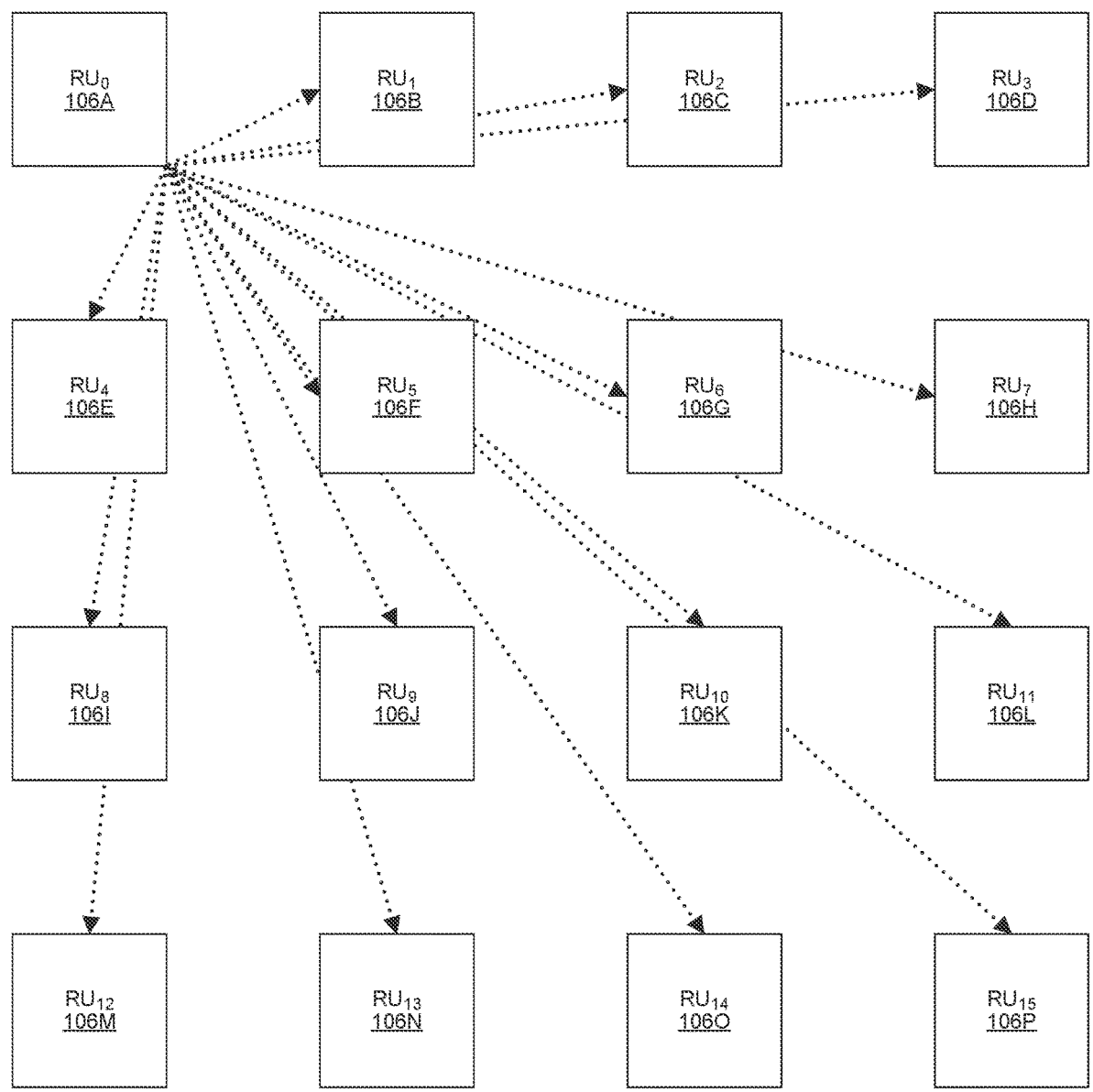
FIG. 5 is a block diagram illustrating a system that performs over-the-air timing alignment compensation in a distributed RAN.

FIG. 5 is a block diagram illustrating a system that performs over-the-air timing alignment compensation in a distributed RAN, e.g., C-RAN 100. The example system includes 16 RUs 106A-P in a C-RAN 100, however, the present systems and methods are equally applicable to any number of RUs 106 present in a distributed RAN, e.g., 2-100. Additionally, while not shown, the C-RAN 100 may have additional element(s), e.g., at least one CU 103, at least one DU 105 at least one baseband controller 104, and/or at least one distribution unit 111. Assume that each RU 106 has some timing drift compared to a master clock. The master clock may be kept at: (1) a DU 105, CU 103, baseband controller 104, or distribution unit 111; or (2) a Global Positioning System (GPS), Network Time Protocol (NTP) computing device, or Precision Time Protocol (PTP) computing device.

The RUs 106 (connected to the same DU 105, baseband controller 104, or distribution unit 111) will be numbered 0-(N-1), where N is the total number of RUs 106 connected with the DU 105, baseband controller 104, or distribution unit 111. In the example illustrated in FIG. 5, N=16 so $RU_0$ 106A through $RU_{15}$ 106P are connected to the same DU 105, baseband controller 104, or distribution unit 111. The DU 105, baseband controller 104, or distribution unit 111 can initiate a timing correction procedure in $RU_0$ 106A during which $RU_0$ 106A will transmit a known pattern signal to all the other RUs 106 ($RU_1$ 106B through $RU_{15}$ 106P). In other words, $RU_0$ 106A transmits a known signal that is received by every other RU 106 connected to the same DU 105 or baseband controller 104. It is understood that each arrow in FIG. 5 represent a signal being transmitted from $RU_0$ 106A and received at another RU 106. The arrows do not necessarily illustrate the actual path the known pattern transmission travels. For example, the transmission from $RU_0$ 106A to $RU_2$ 106C would typically travel a multipath around $RU_1$ 106C (not through $RU_1$ 106C, as illustrated in FIG. 5).

In some configurations, a synchronization signal burst (SSB) block is used as the known pattern transmission. The SSB may include a primary synchronization signal (PSS), a secondary synchronization signal (SSS), and a physical broadcast channel (PBCH). However, it is understood that any predefined sequence that is known to the transmitting RU 106 ($RU_0$ 106A in FIG. 5) and the receiving RU 106 ($RU_1$ 106B through $RU_{15}$ 106P in FIG. 5) can be used.

The other RUs 106 (e.g., $RU_1$ to $RU_{N-1}$) are configured in receive mode and receive the known pattern signal from $RU_0$ 106A. The receive-mode RUs 106 will process the known pattern by estimating the frame and/or symbol boundary difference using their own reception point or sampling clock. In some configurations, the processing done by each receive-mode RU 106 includes correlating the received known pattern signal with a re-generated known pattern signal to estimate a difference in frame or symbol boundaries from the transmission at $RU_0$ 106A to the reception at the respective receive-mode RU 106. For example, the frame or symbol boundary difference measured at $RU_1$ 106B reflects the propagation delay (from $RU_0$ 106A to $RU_1$ 106B) and a timing offset (due to clock drift at $RU_0$ 106A and/or $RU_1$ 106B), while the frame or symbol boundary difference measured at $RU_4$ 106E reflects the propagation delay (from $RU_0$ 106A to $RU_4$ 106E) and a timing offset (due to clock drift at $RU_0$ 106A and/or $RU_4$ 106E). In some configurations, the frame or symbol boundary difference will be a number of nanoseconds.

After all RUs 106 have measured their frame or symbol boundary difference with respect to $RU_0$ 106A, $RU_1$ 106B will move into transmit mode and the rest of the RUs 106 in the system (e.g., $RU_0$ 106A and $RU_2$ 106C through $RU_{15}$ 106P in FIG. 5) will be configured into receive mode. During this time, $RU_1$ 106B will transmit a known pattern signal to the receive-mode RUs 106, which will estimate a frame or symbol boundary difference with respect to the known pattern signal transmitted by $RU_1$ 106B. In turn, all the RUs 106 will take a turn moving into transmit-mode and the receive-mode RUs 106 will estimate the frame or symbol boundary difference with the transmit-mode RU 106. At that point, each RU 106 will have a frame or symbol boundary difference with respect to every other RU 106 present in the system (connected to the same DU 105, baseband controller 104, or distribution unit 111). The RUs 106 may then communicate the time differences to the DU 105 or baseband controller 104 (or other centralized unit).

The DU 105, baseband controller 104, or distribution unit 111 will determine a common alignment point by finding the best timing offset with respect to the timing of the DU 105, baseband controller 104, or distribution unit 111. In some examples, determining a common alignment point includes (1) determining a timing offset (Δ) for each frame or symbol boundary difference based on the corresponding signal strength (e.g., RSSI); and (2) estimating a histogram among the various timing offsets received.

The inter-RU distance may be significant in outdoor environments where propagation delay from one RU 106 to another RU 106 can add significant time delay. The DU 105, baseband controller 104, or distribution unit 111 may account for inter-RU propagation delay across the RUs 106 when determining the timing offsets (used to determine the common alignment point). The inter-RU distance can be calculated using triangulation based on a time delay and signal strength (e.g., RSSI). If each RU 106 antenna is capable of MIMO, an angle of arrival (AoA) and direction of arrival (DoA) are estimated to get accurate location information of the RUs 106. The DU 105 or baseband controller 104 may send final computed values (correction factors) to the RUs 106 to adjust the timing to common timing. The proposed method can run periodically or based on topology modifications. This process will bring down the timing offset error closer to zero.

Figure 6:
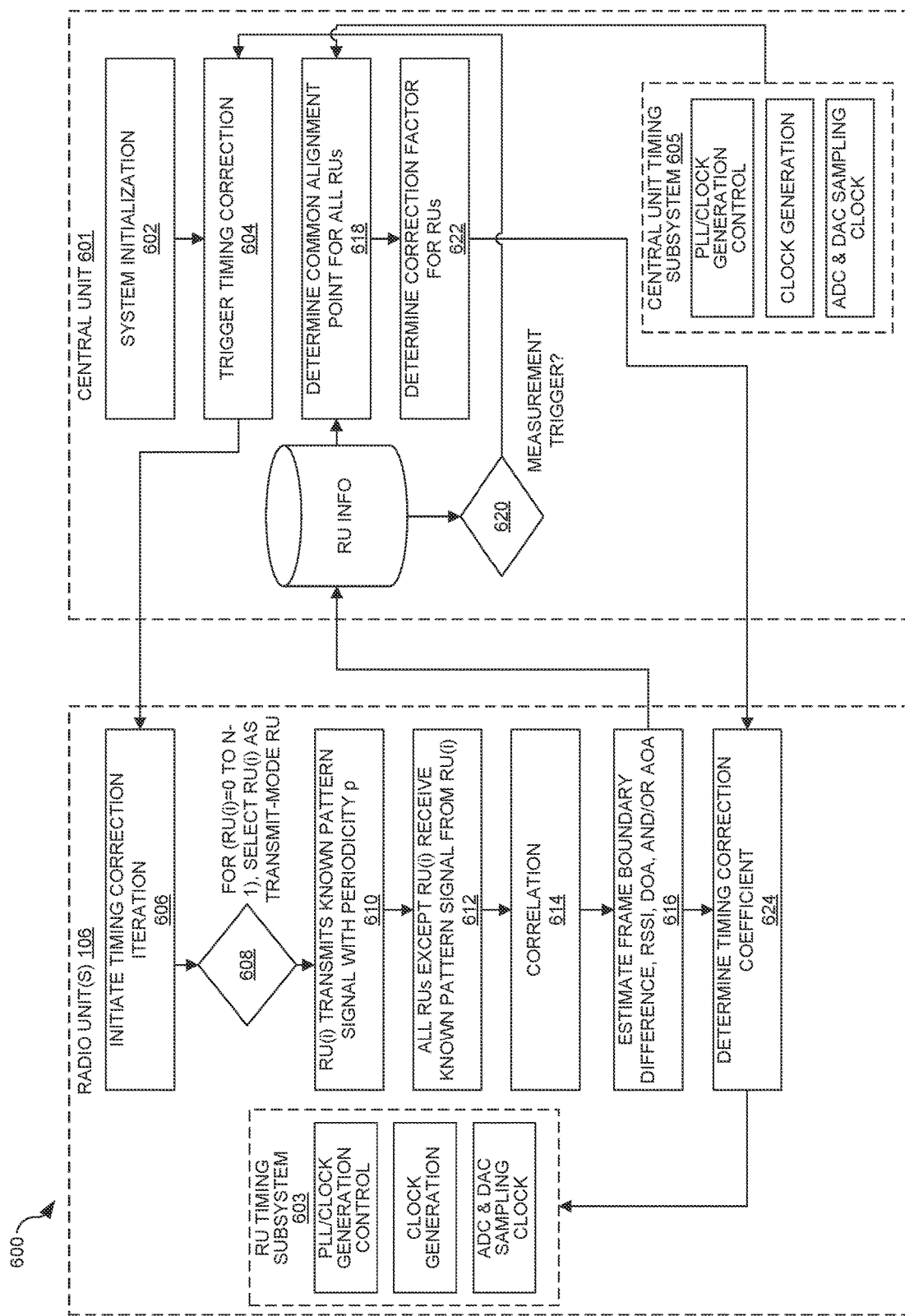
FIG. 6 is a flow diagram illustrating an example method for performing over-the-air timing alignment compensation in a distributed RAN.

FIG. 6 is a flow diagram illustrating an example method 600 for performing over-the-air timing alignment compensation in a distributed RAN. The blocks of the flow diagram are shown in the device implementing them, although other configurations are possible. Specifically, FIG. 6 illustrates steps of the method 600 being performed in (1) a central unit 601 (e.g., a DU 105 or baseband controller 104 in a C-RAN or a distribution unit in a DAS 101); or (2) at least one RU 106 connected to the central unit. Each of the RU 106 and central unit 601 may implement the applicable functionality using at least one processor that executes instructions stored in at least one memory.

Additionally, the blocks of the flow diagram shown in FIG. 6 have been arranged in a generally sequential manner for ease of explanation; however, it is to be understood that this arrangement is merely exemplary, and it should be recognized that the processing associated with method 600 (and the blocks shown in FIG. 6) can occur in a different order (for example, where at least some of the processing associated with the blocks is performed in parallel and/or in an event-driven manner). Also, most standard exception handling is not described for ease of explanation; however, it is to be understood that method 600 can and typically would include such exception handling.

The method 600 begins at step 602 where a system, including the central unit 601, is initialized. For example, a distributed RAN that includes the central unit 601 and a plurality of RUs 106 may be powered up for the first time or after maintenance or re-configuration.

The method 600 proceeds at step 604 where the central unit 601 triggers a timing correction procedure. The timing correction procedure may be triggered in response to system initialization, periodically, and/or based on measurements taken at the RU 106 and/or central unit 601. Triggering a timing correction procedure may include sending an instruction to the RU(s) 106.

The method 600 proceeds at step 606 where the RU 606 initiates a timing correction iteration. For example, the timing correction iteration may include N measurement iterations. In every measurement iteration, steps 608-616 may be performed for $RU_0$ to RUN-1. In a first measurement iteration (of step 608-616): (1) $RU_0$ 106A is selected as the transmit-mode RU 106 (step 608); (2) $RU_0$ 106A transmits a known pattern signal to all other RUs 106 connected to the same central unit 601 (step 610); (3) the other (receive-mode) RUs 106 will each receive the known pattern signal from $RU_0$ 106A (step 612); (3) the receive-mode RUs 106 correlate the received known pattern signal with a re-generated known pattern signal (step 614); and (4) the receive-mode RUs 106 estimate a frame or symbol boundary difference based on the correlation and an RSSI based on the received known pattern signal (step 616), along with optional DoA and/or AoA.

With reference to the propagation model of FIG. 3, the receiving RUs 106 ($RU_1$ to $RU_{N-1}$) each determine a frame or symbol boundary difference ($\mathfrak{F}_y$) from $RU_0$ 106A in steps 614-616. Each frame or symbol boundary difference may indicate a length of time from when $RU_0$ 106A transmitted the known pattern signal (according to its clock) to when a respective receive-mode RU 106 receives the known pattern signal at its antenna port (according to its clock). In examples, the frame or symbol boundary difference between $RU_0$ 106A and $RU_1$ 106B is estimated at the receiving RU 106 using correlation (similarity) between the incoming/received known pattern signal and a re-generated version of the known pattern signal. Optionally, the known pattern signal may be decoded at the receiving RUs 106. Additionally, each receiving RU 106 may optionally estimate the signal strength (e.g., RSSI) of the received known pattern signal.

During each successive measurement iteration of the timing correction iteration, a different RU 106 will enter transmit-mode during which all other RUs 106 connected to the same central unit 601 will be in receive mode to measure the frame or symbol boundary difference and optionally the signal strength (e.g., RSSI) of the received known pattern signal. For example, $RU_1$ 106B will enter transmit mode and transmit a known pattern signal to $RU_0$ 106A and $RU_2$ 106C through $RU_{N-1}$ during a second measurement iteration, followed by $RU_2$ 106C entering transmit mode to transmit the known pattern signal to $RU_0$ 106A, $RU_1$ 106B, and $RU_3$ 106D through $RU_{N-1}$ during a third measurement iteration, etc.

In step 616, each RU 106 estimates at least a frame or symbol boundary difference with every other RU 106 and a corresponding signal strength (e.g., RSSI). At the end of N measurement iterations, each of the N RUs 106 will have a frame or symbol boundary difference with respect to every other of the N RUs 106, along with a corresponding signal strength (e.g., RSSI), e.g., a total of N RUs*(N-1) frame or symbol boundary differences estimated across all RUs 106. Optionally, each RU 106 may estimate an angle of arrival (AoA) and/or direction of arrival (DoA) from each other RU 106 during a measurement iteration (e.g., that can be used later to determine location information for MIMO antennas).

The frame or symbol boundary difference, signal strength, AoA, and/or DoA are sent to the central unit 601 (e.g., a baseband controller 104, 5G CU 103, 5G DU 105, or distribution unit 111) via a fronthaul network 116 for further processing. The central unit 601 may store the information from all connected RUs 106 in a database, cloud storage, or other memory.

The method 600 proceeds to step 618 where the central unit 601 determines a common alignment point (CAP) for all RUs 106. The central unit 601 may use at least some of the information for the connected RUs 106 to determine the common alignment point. Finding the CAP may include finding the Timing Offset (Δ) by using a histogram, described below. The CAP may act as a common time to which all the RUs 106 can align.

The CAP may be determined, in part, using a histogram of the timing offsets (Δ). Specifically, the common time across all RUs 106 (in step 618) can be determined using a histogram, illustrated in FIG. 7. Each timing offset (Δ) may be estimated based on a propagation delay between two RUs 106 and/or a respective frame or symbol boundary difference. For example, each timing offset (Δ) may be determined by (1) subtracting a propagation delay between two RUs 106 from a frame or symbol boundary difference between the two RUs 106; (2) using Fast Fourier Transform (FFT); and/or peak finding. The propagation delay can be determined from the inter-RU distance using triangulation based of the received power (e.g., RSSI) at each receive-mode RU 106. If each RU 106 antenna is capable of MIMO, an angle of arrival (AoA) and/or direction of arrival (DoA) can be used to get accurate location information of the antennas.

Figure 7:
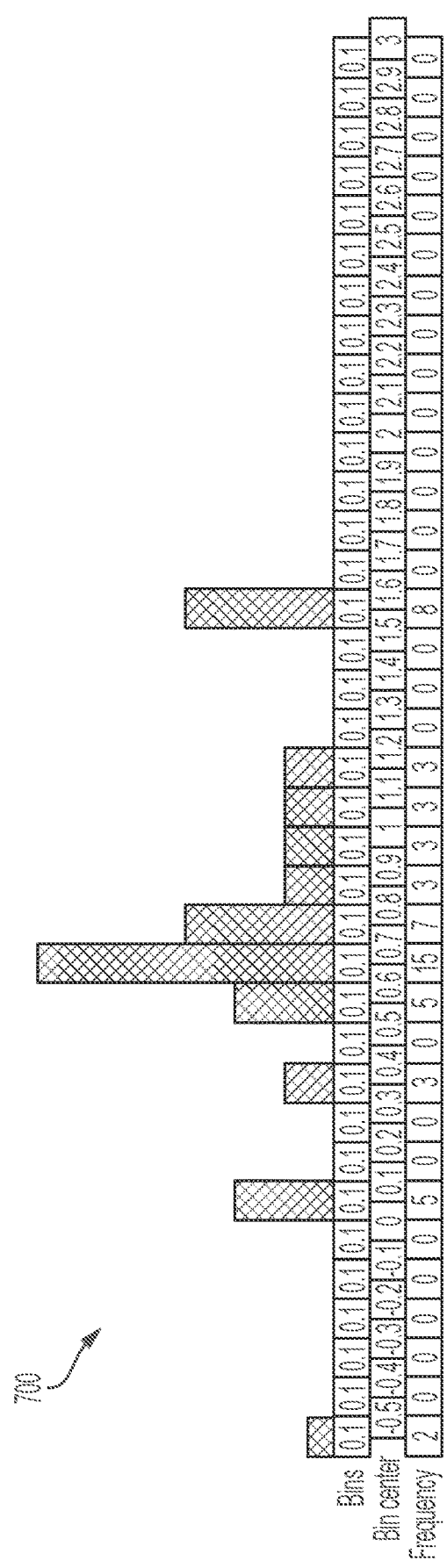
FIG. 7 is a block diagram illustrating an example histogram used to determine a common alignment point (CAP)

FIG. 7 is a block diagram illustrating an example histogram 700 used to determine a common alignment point (CAP). To create the histogram, timing offsets (Δ) from different RUs 106 are mapped to multiple time delay bins where the bin width and bin center is defined as X nanoseconds (or alternatively, Y picoseconds), e.g., 0.01 microseconds, 10 nanoseconds, or 10,000 picoseconds. The bin center whose bin count is highest will qualify as the CAP value. The CAP value will be used across all RUs 106 for aligning their transmit signals.

In the example histogram 700 of FIG. 7, the bin with the most (15) timing offsets (Δ) is the bin centered at 0.6 microseconds (600 nanoseconds). Accordingly, the CAP would be chosen as 0.6 microseconds (600 nanoseconds).

Optionally (if the central unit 601 is not acting as the master/global timing reference), the CAP may be further adjusted to account for the misalignment of the central unit 601 timing to the master clock timing. In other words, the CAP may be adjusted by +/−central unit timing when the central unit 601 is not acting as the master/global timing reference.

In some examples, a CAP may be determined periodically where the periodicity chosen is based on the type of master clock (e.g., GPS, NTP, PTP, SyncE or from the DU 105) used to derive timing. It should also be noted that the common timing may be determined in other ways, e.g., averaging the different timing offsets from the RUs 106. In examples, step 618 may utilize input from the DU timing subsystem 605 (implementing PLL/clock generation control functionality, clock generation functionality, and/or an ADC/DAC sampling clock).

After a CAP is determined (and optionally adjusted), the method 600 proceeds at step 622 where the central unit 601 determines correction factors for individual RUs 106 based on the CAP. The correction factors are the different adjustments to make the individual RUs 106 align with the CAP (adjusted or unadjusted CAP, depending on whether the central unit 601 acts as the master/global timing reference).

As an example of steps 618 and 622, assume that a system has four RUs 106 with the following timing offsets: RU0—2 ns; RU1—2 ns; RU2—4 ns; and RU3—2 ns (although there could and likely would be more timing offsets determined for a four-RU distributed RAN). The common timing could be determined as an average of the timing offsets: (2+2+4+2)/4=2.5 ns, which is the CAP (step 618). If the central unit 601 is acting as the master clock, the central unit 601 timing would be aligned to the master/global timing (and the RUs 106 could be aligned to master/global timing if aligned to the unadjusted CAP). In this scenario, the correction factor (step 622) for each RU 106 would be the timing offset for the RU minus the unadjusted CAP. So, for example, the correction factor for RU0, RU1, and RU3 would be 2−2.5=−0.5 ns, while the correction factor for RU2 would be 4−2.5=+1.5 ns.

If the central unit 601 is not acting as the master clock in this same example, however, the RU timing would not be aligned with master timing (e.g., GPS, PTP, etc.) if aligned with the unadjusted CAP. Rather, the CAP would need to be further adjusted to account for the central unit 601 (e.g., DU 105) timing as well. In this case, the estimated CAP would be 2.5 ns+/−central unit timing (relative to master timing). Accordingly, the correction factor for RU0, RU1, and RU3 would be 2−(2.5+/−central unit timing), while the correction factor for RU2 would be 4−(2.5+/−central unit timing). At that point, all RU's will be aligned with master/global timing if they were aligned with the adjusted CAP.

For example, if the correction factor for an RU 106 is +1.5 ns, the RU 106 may advance its timing 1.5 ns. Alternatively, if the correction factor for an RU 106 is −1.5 ns, the RU 106 may delay its timing 1.5 ns.

It should be noted that the CAP in the above example may alternatively be determined using a histogram (instead of averaging the timing offsets). In some cases, the different ways of determining the CAP (e.g., averaging vs histogram of timing offsets) might result in a slightly different CAP values.

The method 600 proceeds at step 624 where the RUs 106, using the individual correction factors, determine a timing correction coefficient. The timing correction coefficient may be used by the RU timing subsystem 603 (implementing PLL/clock generation control functionality, clock generation functionality, and/or an ADC/DAC sampling clock) to delay or advance the RU's clock.

Example of Timing Offset Estimation

Figure 8:
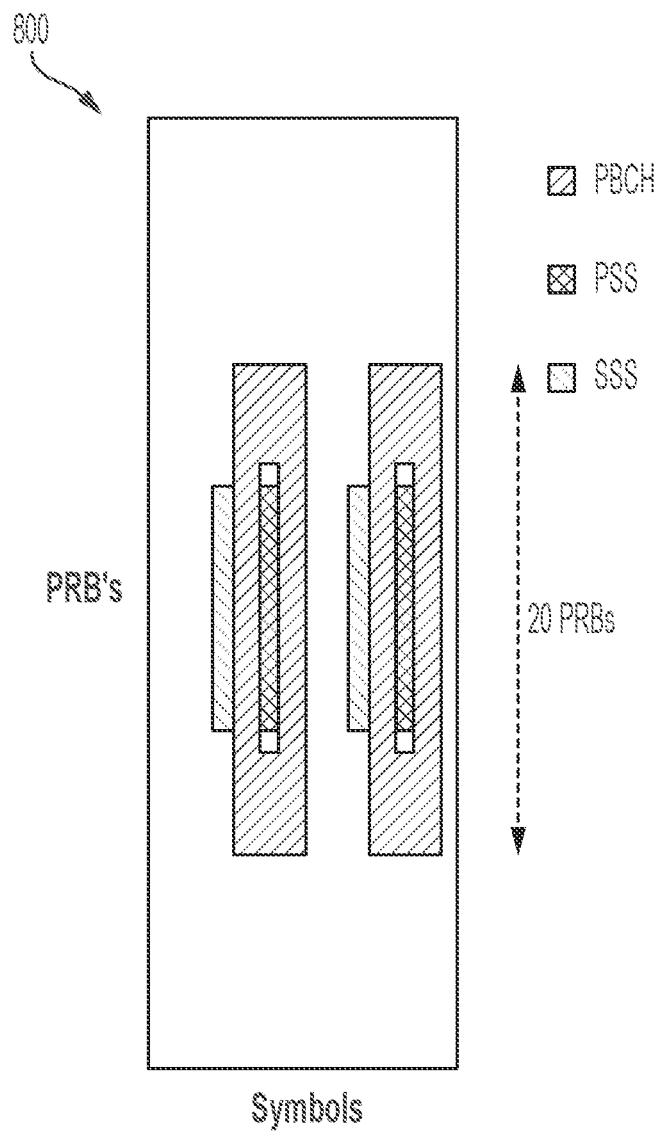
FIG. 8 is a block diagram illustrating an example mapping of a synchronization signal burst (SSB) block signal used as a known pattern signal.

FIG. 8 is a block diagram illustrating an example mapping 800 of a synchronization signal burst (SSB) block signal used as a known pattern signal. The SSB block may include a primary synchronization signal (PSS), a secondary synchronization signal (SSS), and a physical broadcast channel (PBCH). The SSB block signal may be transmitted across 20 PRBs. However, it us understood that SSB block is only one possible example of a known pattern that can be used herein. For example, a proprietary pattern could be used instead of the SSB block.

The following is a more-detailed description of the timing offset estimation previously described herein. In this example, assume the received known pattern signal is an orthogonal frequency-division multiplexing (OFDM) signal, x(n), e.g., carrying the synchronization signal burst (SSB) block. This signal can be modeled as:

$$x(n) = \frac{1}{\sqrt{N}} \sum_{k=0}^{N-1} X_k e^{j2\pi kn/N} \text{ for } 1 \leq n \leq N$$

where $X_k$ are the modulated symbols; N is the Fast Fourier Transform (FFT) size; and k=0, 1, 2, ... N−1.

The transmitted known pattern signal (e.g., SSB block signal) is received by one or more RUs 106, where the received signal y(n) with the additive white Gaussian noise (AWGN) is denoted as:

$$y(n)=[x(n) \circledast h(n)]+w(n)$$

where h(n) is the channel impulse response; and w(n) is Gaussian noise.

The receiving RUs 106 may estimate the propagation delay, path loss, channel correlation, and/or receiving antenna correlation to estimate the received signal y(n) corresponding to the index of the RU 106. Assume the received signal y(n) is transmitted over a channel with propagation delay. Specifically, assume the channel is a multi-path, fading channel and the channel impulse response is represented as:

$$h(n)=\Sigma_{d=0}^{N_d-1} h_d \delta(n-d)$$

where $N_d$ is the number of channel taps; hd is the complex value of the dth Rayleigh distributed tap(s); d is the propagation (or path) delay; δ is a multipath propagation function; and n is the number of multipaths.

The N samples of the received signal are transformed into the frequency domain via a Fast Fourier Transform (FFT). After applying N-point FFT to the received signal, the OFDM signal in frequency domain Y(k) is given by:

$$Y(k) = \frac{1}{\sqrt{N}} \sum_{n=0}^{N-1} x(n) e^{-i2\pi kn/N};$$

which can be re-written as:

$$Y(k) = \frac{1}{N} \sum_{k=0}^{N-1} X_k H_k + W_k;$$

where $H_k$ is the channel impulse response in the frequency domain and is represented by the following equation:

$$H_k = \Sigma_{k=0}^{N-1} h(n) e^{-i2\pi kn/N};$$

and $W_k$ is white Gaussian Noise in the frequency domain represented by the following equation:

$$W_k = \frac{1}{\sqrt{N}} \sum_{n=0}^{N-1} w(n) e^{-i2\pi kn/N}.$$

The received OFDM signal in the frequency domain (Y(k)) may be de-mapped according to subcarrier. The subcarrier de-mapping for the received signal is represented as:

$$Z(k) = \frac{1}{N} \sum_k X_k H_k$$

where $$k \in \left\{ \left(0, \frac{q}{2}-1\right) \cup \left(N - \frac{q}{2} - 1, N-1\right) \right\}; \text{ and } q = \text{Number of Subcarriers}.$$

The timing offset may then be estimated using correlation. The discrete periodic correlation between the de-mapped received signal Z(k) and the reference signal X(k) is denoted as R(k). R (k) can be efficiently computed in the frequency domain by using the properties of DFT:

$$R(k)=Z(k)*X^*(k) \text{ for } k=0,1,\ldots,N-1$$

where X*(k) is the re-generated signal on the receiver side (X(k) is the transmitted signal at the transmitter side); r(n) is the time domain version of R(k) and can be computed by taking the Inverse Discrete Fourier Transform (IDFT) of R(k) as follows:

$$r(n) = \sum_{k=0}^{N-1} Z(k) e^{\frac{i2\pi kn}{N}} \text{ for } n = 0, 1, \ldots, N-1.$$

Figure 9:
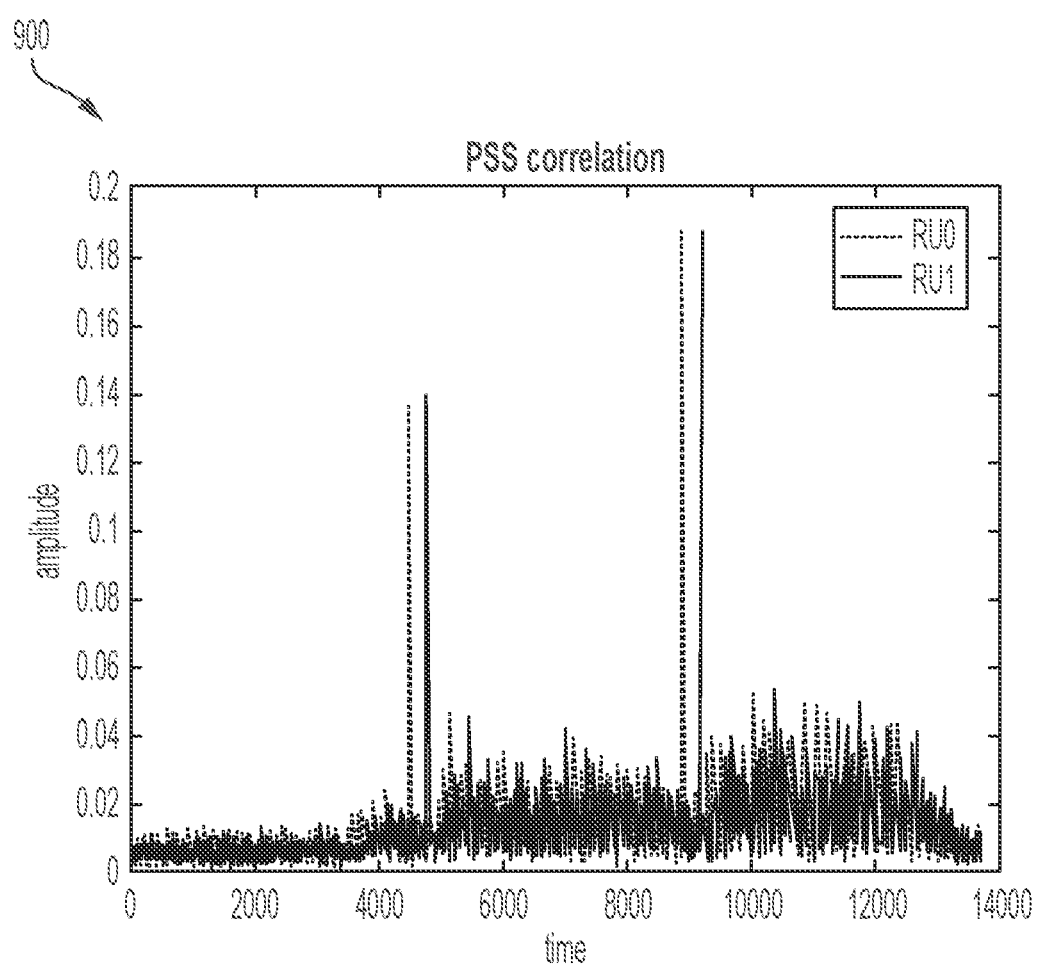
FIG. 9 is a time versus amplitude graph of a signal received by two different RUs.

FIG. 9 is a time versus amplitude graph 900 of a signal received by two different RUs 106, e.g., RU0 and RU1. Specifically, FIG. 9 illustrates the correlation of two signals received at each of the two RUs 106. The timing offset between the two RUs 106 is calculated by estimating the number of samples between two peaks.

Additionally, a received signal strength indication (RSSI) is a measurement of the power present in a received signal. RSSI is an indication of the power level being received by the receiving device (e.g., RU 106) after the antenna and possible cable loss. The higher the RSSI number, the stronger the received signal. The power of the received signal can be measured according to:

$$\text{Power} = \frac{1}{N} \sum_{k=0}^{N-1} |Z(k)|^2$$

where, Z(k) is the received de-mapped signal in the frequency domain.

These RSSI measurements are sent to the central unit 601 and the same steps are repeated for the transmission of the known pattern signal from the other RUs 106 present in the environment during subsequent measurement iterations.

Method

Figure 10:
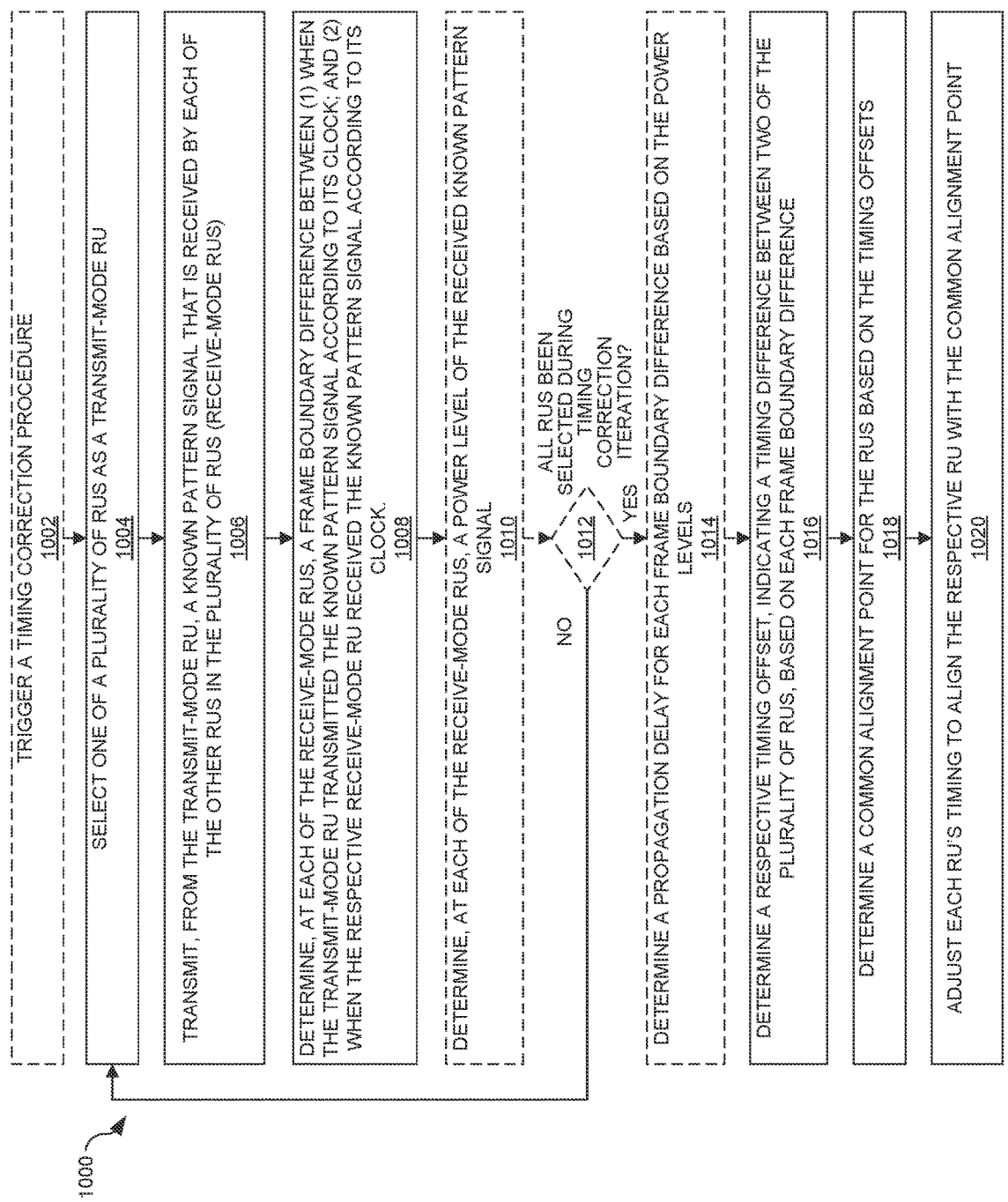
FIG. 10 is a flow diagram illustrating another example method for performing over-the-air timing alignment compensation in a distributed RAN.

FIG. 10 is a flow diagram illustrating another example method 1000 for performing over-the-air timing alignment compensation in a distributed RAN. The method 1000 may be performed in any type of distributed RAN, e.g., a distributed antenna system (DAS) 101 or a C-RAN 100 implementing the LTE and/or 5G air interface. The distributed RAN includes at least (1) a central unit (e.g., a DU 105 or baseband controller 104 in a C-RAN or a distribution unit in a DAS 101); and (2) a plurality of RUs 106 connected to the central unit. Each of the RU 106 and central unit may implement at least some of the functionality using at least one processor that executes instructions stored in at least one memory.

Additionally, the blocks of the flow diagram shown in FIG. 10 have been arranged in a generally sequential manner for ease of explanation; however, it is to be understood that this arrangement is merely exemplary, and it should be recognized that the processing associated with method 1000 (and the blocks shown in FIG. 10) can occur in a different order (for example, where at least some of the processing associated with the blocks is performed in parallel and/or in an event-driven manner). Also, most standard exception handling is not described for ease of explanation; however, it is to be understood that method 1000 can and typically would include such exception handling.

The method 1000 begins at optional step 1002 where the central unit triggers a timing correction procedure/iteration. The timing correction procedure may be triggered in response to system initialization, periodically, and/or based on measurements taken at the RU 106 or central unit 601. Triggering a timing correction procedure/iteration may include sending an instruction to the RUs 106 connected to the central unit. Each timing correction iteration can include one or more measurement iterations (where steps 1004-1110 are performed during each measurement iteration). For example, each timing correction iteration may include as many measurement iterations as there are RUs 106 connected to the central unit.

The method 1000 proceeds at step 1004 where one of the plurality of RUs 106 is selected as the transmit-mode RU 106. The transmit-mode RU 106 may be selected by the central unit. Alternatively, the RUs 106 may coordinate to determine which RU is the transmit-mode RU 106. In some examples, the transmit-mode RU 106 may be selected based on identifiers assigned to the RUs 106. For example, each RU 106 connected to the central unit may be assigned a BC ID and/or a Sector ID, after which the RU 106 with the lowest or highest BC ID or Sector ID, which has not previously been selected as the transmit-mode RU 106, is selected as the transmit-mode RU 106. However, it is understood that any suitable mechanism may be used to select the transmit-mode RU 106. The RU(s) 106 not selected as the transmit-mode RU 106 are considered receive-mode RU(s) 106.

The method 1000 proceeds at step 1006 where the transmit-mode RU 106 transmits a known pattern signal that is received by each of the other RUs 106 in the plurality of RUs 106 (each of the receive-mode RUs 106). The known pattern signal includes a pattern known to both the transmit-mode RU 106 and each receive-mode RU 106. For example, the known pattern signal may be an SSB block signal that includes a primary synchronization signal (PSS), a secondary synchronization signal (SSS), and a physical broadcast channel (PBCH).

The method 1000 proceeds at step 1008 where each receive-mode RU 106 determines a frame or symbol boundary difference between (1) when the transmit-mode RU 106 transmitted the known pattern signal according to its clock; and (2) when the respective receive-mode RU 106 received the known pattern signal according to its clock. For example, the frame or symbol boundary difference may be determined at each receive-mode RU 106 by correlating the received known pattern signal with a re-generated version of the known pattern signal, e.g., as described above. The frame or symbol boundary difference measured at each receive-mode RU 106 reflects the propagation delay (from the transmit-mode RU 106 to the receive-mode RU 106) and a timing offset (due to clock drift at the transmit-mode RU 106 and/or the receive-mode RU 106). The frame or symbol boundary difference may be a length of time, e.g., measured in nanoseconds.

The method 1000 proceeds at optional step 1010 where each receive-mode RU 106 determines a power level (e.g., RSSI) of the received known pattern signal. In some examples, the power can be estimated based on the de-mapped known pattern signal, as described above.

The method 1000 proceeds at optional step 1012 where at least one (e.g., all) of the RUs 106 determines whether all RUs 106 have been selected during the current timing correction iteration. In other words, it is determined whether every one of the plurality of RUs 106, connected to the central unit, have been selected as the transmit-mode RU 106 during a measurement iteration of the current timing correction iteration. If not, a new transmit-mode RU 106 is selected (and the previous transmit-mode RU 106 becomes a receive-mode RU 106), e.g., steps 1004-1010 is repeated.

When the measurement iteration(s) are complete, the central unit may determines timing adjustments based on the frame boundary differences estimated or measured the RUs 106.

For example, if all the RUs 106 have been selected already, the method 1000 proceeds at optional step 1014 where the central unit determines a propagation delay for each frame or symbol boundary difference based on the power levels. For example, the central unit may use the power levels of the received known pattern signals to triangulate the locations of the RUs 106 and, thereafter, distances between the plurality of RUs 106. Alternatively or additionally, the locations of the RUs 106 and/or distances between the plurality of RUs 106 may be determined based on a predetermined list (e.g., from an operator via a management system, GPS coordinates available to the central unit, etc.). Furthermore, for RU 106 antennas capable of MIMO, an angle of arrival (AoA) and/or direction of arrival (DoA) may be estimated by the receive-mode RUs 106 (and sent to the central unit 601) to get accurate location information of the RUs 106.

The frame or symbol boundary differences and power levels (e.g., RSSIs) may be sent from the RUs 106 to the central unit all at once or as they are determined. For example, the frame or symbol boundary differences and power levels (e.g., RSSIs) may be sent to the central unit via a fronthaul network 116. If determined, AoAs and/or DoAs may also be transmitted from the RUs 106 to the central unit.

The method 1000 proceeds at step 1016 where the central unit determines a respective timing offset, indicating a timing difference between two of the RUs 106, based on each frame or symbol boundary difference. This may include the central unit subtracting a respective propagation delay from each frame or symbol boundary difference to determine timing offsets (Δ) between the plurality of RUs 106.

The method 1000 proceeds at step 1018 where the central unit determines a common alignment point (CAP) for all RUs 106. The central unit 601 may use at least some of the information for the connected RUs 106 to determine the CAP. To determine the CAP in some examples, timing offsets (Δ) from different RUs 106 are mapped to multiple time delay bins in a histogram where the bin width and bin center is defined X nanoseconds, e.g., 0.1 microseconds or 100 nanoseconds. The bin center whose bin count is highest will qualify as the CAP value. The CAP value will be used across all RUs 106 for aligning their transmit signals. For example, the bin with the most timing offsets (Δ) may be chosen as the CAP. Alternatively, the CAP may be determined by averaging (or weighted averaging) the different timing offsets for the RUs 106.

However, if the central unit 601 was not acting as the master/global timing reference, the unadjusted CAP would align the RUs 106 to each other but not to the master clock. Accordingly, when the central unit 601 is not acting as the master/global timing reference, the CAP may be further adjusted to account for the timing difference between the master clock and the central unit 601. For example, when the central unit 601 is not acting as the master clock in this same example, the CAP may be further adjusted +/−central unit timing (relative to master timing).

The method 1000 proceeds at step 1020 where each RU's 106 timing is adjusted to align with the CAP. Because different RUs 106 may have different timing differences with the CAP, the adjustments made to the different RUs' 106 timing may also be different. Specifically, each RU's 106 timing would be adjusted by (the timing offset for the RU)— (the CAP). As described above, the CAP is (1)

unadjusted when the central unit 601 acts as the master/global timing reference; or (2) further adjusted by +/−the central unit's timing (relative to master timing) when the central unit 601 is not acting as the master clock.

For example, if an RU's clock is ahead/advanced beyond the CAP, the RU 106 may delay its clock a corresponding amount. Alternatively, if an RU's clock is behind/lags the CAP, the RU 106 may advance its clock a corresponding amount. Delaying or advancing a clock may include determining a timing correction coefficient for a phase-lock loop (PLL) used to generate the clock in the RU 106. After respective adjustments have been made to each RU's 106 timing, the RUs 106 in the distributed RAN will be aligned to the CAP, which is also aligned with the master clock (e.g., central unit 601).

Simulation Results

Assume the following simulation configuration (where the SSB is used as the known pattern):

Number of transmitter antennas (ntxants)=8;
Number of receiver antennas (nrxants)=2;
Carrier frequency=1 GHz;
Height at which RUs are placed in meters (HeightVal)=10;
Inter-RU distance in meters (InterRPDistance)=50;
X coordinates in meters (XCord)=[50 100 150 200];
Y coordinates in meters (YCord)=[50 100];
SSB block pattern used (burst.BlockPattern)='Case D' (location and configuration of SSB signal according to 3GPP NR/5G specification);
SSB Periodicity (burst.SSBPeriodicity)=20 milliseconds (the SSBs are transmitted 20 ms once from Tx);
Number of radio frames (burst.NFrame)=4;
SSB transmission pattern (burst.SSBTransmitted)=[1 1 1 1 zeros (1,60)];
Physical layer cell identity (burst.NCellID)=102;
Number of RUs (NumofRP)=4;
Sub-carrier spacing (gnb.SubcarrierSpacing)=120 kHz;
Total number of PRBs (gnb.NRB)=66; and
Cyclic prefix type (gnb.CyclicPrefix)='Normal'.

Using the example configuration, Table 1 shows estimated inter-RU distance for a four-RU simulation:

TABLE 1

| | Rx | | | |
|---|---|---|---|---|
| Tx | RU 0 | RU 1 | RU 2 | RU 3 |
| RU 0 | 0 | 50.0142 | 100.0284 | 150.0426 |
| RU 1 | 50.0142 | 0 | 50.0142 | 100.0284 |
| RU 2 | 100.0284 | 50.0142 | 0 | 50.0142 |
| RU 3 | 150.0426 | 100.0284 | 50.0142 | 0 |

The estimated timing offset (in $T_s$) between each RU is given in Table 2:

TABLE 2

| | Rx | | | |
|---|---|---|---|---|
| Tx | RU 0 | RU 1 | RU 2 | RU 3 |
| RU 0 | 0 | −41 | −82 | −123 |
| RU 1 | −41 | 0 | −41 | −82 |
| RU 2 | −82 | −41 | 0 | −41 |
| RU 3 | −123 | −82 | −41 | 0 |

The estimated RSSI (in dB) between each RU is given by Table 3:

TABLE 3

| | Rx | | | |
|---|---|---|---|---|
| Tx | RU 0 | RU 1 | RU 2 | RU 3 |
| RU 0 | N.A | −62.5162 | −74.8948 | −82.1219 |
| RU 1 | −62.5359 | N.A | −62.4994 | −74.8841 |
| RU 2 | −74.8016 | −62.4482 | N.A | −62.4882 |
| RU 3 | −82.2622 | −74.9578 | −62.5237 | N.A |

Figure 11:
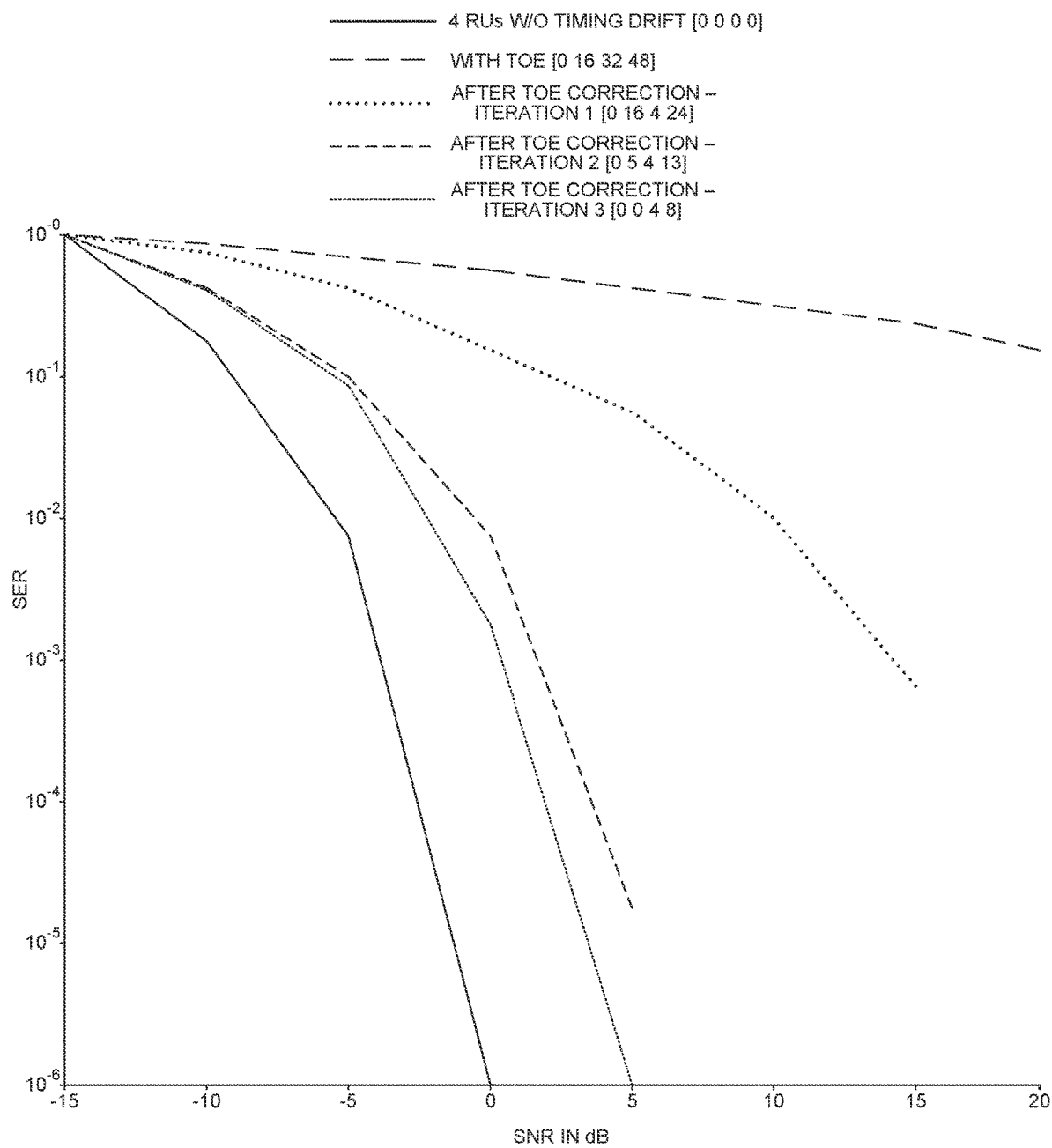
FIG. 11 is a plot illustrating symbol error rates for a four-RU simulation example.

FIG. 11 is a plot illustrating symbol error rates for a four-RU simulation example, e.g., the simulation example described above. The performance of the RUs is affected by different timing offset errors (TOEs) of RUs 106 serving a single UE 110. In other words, FIG. 11 illustrates downlink system performance for a distributed RAN (e.g., C-RAN 110) with four RUs 106 (n=4), although a distributed RAN may have more or less than four RUs 106.

Specifically, FIG. 11 illustrates the Symbol Error Rate (SER) for five different scenarios. In a first scenario (solid line), the four RUs 106 don't have any timing offsets/drifts between each other. In a second scenario (long dashed line), the four RUs 106 have timing offsets/drifts of 0, 16, 32, and 48 nanoseconds, respectively, before any TOE compensation/correction occurs. In a third scenario (spaced, dotted line), the four RUs 106 have timing offsets/drifts of 0, 16, 4, and 24, respectively, after a first timing correction iteration occurs. In a fourth scenario (small dashed line), the four RUs 106 have timing offsets/drifts of 0, 5, 4, and 13, respectively, after a second timing correction iteration occurs. In a fifth scenario (small, dotted line), the four RUs 106 have timing offsets/drifts of 0, 0, 4, and 8, respectively, after a third timing correction iteration occurs. The plot shows that performance improves (SER reduces and better SNR) as more timing correction iteration are performed.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. For example, where a computing device is described as performing an action, the computing device may carry out this action using at least one processor executing instructions stored on at least one memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

Terminology

Brief definitions of terms, abbreviations, and phrases used throughout this application are given below.

The term "determining" and its variants may include calculating, extracting, generating, computing, processing, deriving, modeling, investigating, looking up (e.g., looking up in a table, a database or another data structure), ascertaining and the like. Also, "determining" may also include receiving (e.g., receiving information), accessing (e.g., accessing data in a memory) and the like. Also, "determining" may include resolving, selecting, choosing, establishing and the like.

The phrase "based on" does not mean "based only on," unless expressly specified otherwise. In other words, the phrase "based on" describes both "based only on" and "based at least on". Additionally, the term "and/or" means "and" or "or". For example, "A and/or B" can mean "A", "B", or "A and B". Additionally, "A, B, and/or C" can mean "A alone," "B alone," "C alone," "A and B," "A and C," "B and C" or "A, B, and C."

The terms "connected", "coupled", and "communicatively coupled" and related terms may refer to direct or indirect connections. If the specification states a component or feature "may," "can," "could," or "might" be included or have a characteristic, that particular component or feature is not required to be included or have the characteristic.

The terms "responsive" or "in response to" may indicate that an action is performed completely or partially in response to another action. The term "module" refers to a functional component implemented in software, hardware, or firmware (or any combination thereof) component.

The methods disclosed herein comprise one or more steps or actions for achieving the described method. Unless a specific order of steps or actions is required for proper operation of the method that is being described, the order and/or use of specific steps and/or actions may be modified without departing from the scope of the claims.

In conclusion, the present disclosure provides novel systems, methods, and arrangements for over-the-air timing alignment compensation in a distributed RAN. While detailed descriptions of one or more configurations of the disclosure have been given above, various alternatives, modifications, and equivalents will be apparent to those skilled in the art without varying from the spirit of the disclosure. For example, while the configurations described above refer to particular features, functions, procedures, components, elements, and/or structures, the scope of this disclosure also includes configurations having different combinations of features, functions, procedures, components, elements, and/or structures, and configurations that do not include all of the described features, functions, procedures, components, elements, and/or structures. Accordingly, the scope of the present disclosure is intended to embrace all such alternatives, modifications, and variations as fall within the scope of the claims, together with all equivalents thereof. Therefore, the above description should not be taken as limiting.

EXAMPLE EMBODIMENTS

Example 1 includes a distributed radio access network (RAN), comprising: a plurality of remote units (RUs), each being configured to exchange radio frequency (RF) signals with at least one user equipment (UE); and a centralized unit communicatively coupled to the plurality of RUs via a fronthaul network; wherein, during each of at least one measurement iteration: one of the plurality of RUs is selected as a transmit-mode RU and all other of the plurality of RUs are in receive-mode; the transmit mode-RU transmits a known pattern signal to the receive-mode RUs; and each receive-mode RU determines a frame or symbol boundary difference between when the transmit-mode RU transmitted the known pattern signal according to its clock and when the respective receive-mode RU received the known pattern signal according to its clock.

Example 2 includes the distributed RAN of Example 1, wherein, following the at least one measurement iteration: the centralized unit determines a respective timing offset, indicating a timing difference between two of the plurality of RUs, based on each frame or symbol boundary difference; the central unit determines a common alignment point for the RUs based on the timing offsets; and each RU's timing is adjusted to align with the common alignment point.

Example 3 includes the distributed RAN of any of Examples 1-2, wherein the centralized unit is a Distributed Unit or a central unit configured to operate in a Third Generation Partnership Project Fifth Generation communication system.

Example 4 includes the distributed RAN of any of Examples 1-3, wherein the centralized unit is a baseband controller configured to operate in a Third Generation Partnership Project Long Term Evolution communication system.

Example 5 includes the distributed RAN of any of Examples 1-4, wherein the centralized unit is a centralized distribution unit in a distributed antenna system.

Example 6 includes the distributed RAN of any of Examples 1-5, wherein each RU is selected as the transmit-mode RU during exactly one measurement iteration in a timing correction iteration.

Example 7 includes the distributed RAN of any of Examples 1-6, wherein each receive-mode RU determines a frame or symbol boundary difference by correlating the received known pattern signal with a re-generated known pattern signal.

Example 8 includes the distributed RAN of any of Examples 2-7, wherein during each measurement iteration, each receive-mode RU determines a power level of the received known pattern signal.

Example 9 includes the distributed RAN of Example 8, wherein following the at least one measurement iteration, the centralized unit determines a propagation delay for each frame or symbol boundary difference based on the power levels.

Example 10 includes the distributed RAN of any of Examples 2-9, wherein the centralized unit determines each timing offset based on a respective propagation delay and a respective frame or symbol boundary difference.

Example 11 includes the distributed RAN of any of Examples 2-10, wherein the centralized unit determines the common alignment point by: mapping each timing offset to bins in a histogram; and selecting a bin with the most timing offsets as the common alignment point.

Example 12 includes the distributed RAN of Example 11, wherein, when the centralized unit does not act as a master clock, the centralized unit further adjusts the common alignment point to offset a timing difference between the centralized unit and the master clock.

Example 13 includes the distributed RAN of any of Examples 2-12, wherein the centralized unit estimates the common alignment point for all the plurality of RUs, based on the timing offsets, using reports from at least some of the plurality of RUs.

Example 14 includes a method performed by a distributed radio access network (RAN), the method comprising: during each of at least one measurement iteration: selecting one of a plurality of radio units (RUs) as a transmit-mode RU and all other of the plurality of RUs as receive-mode RUs, wherein the plurality of RUs are communicatively coupled to a centralized unit in the distributed RAN; transmitting, from the transmit mode-RU, a known pattern signal to the receive-mode RUs; and determining, at each receive-mode RU, a frame or symbol boundary difference between when the transmit-mode RU transmitted the known pattern signal according to its clock and when the respective receive-mode RU received the known pattern signal according to its clock.

Example 15 includes the method of Example 14, further comprising, following the at least one measurement iteration: determining a respective timing offset, indicating a timing difference between two of the plurality of RUs, based on each frame or symbol boundary difference; determining a common alignment point for the RUs based on the timing offsets; and adjusting each RU's timing to align with the common alignment point.

Example 16 includes the method of any of Examples 14-15, wherein the centralized unit is a Distributed Unit or a Central Unit configured to operate in a Third Generation Partnership Project Fifth Generation communication system.

Example 17 includes the method of any of Examples 14-16, wherein the centralized unit is a baseband controller configured to operate in a Third Generation Partnership Project Long Term Evolution communication system.

Example 18 includes the method of any of Examples 14-17, wherein the centralized unit is a centralized distribution unit in a distributed antenna system.

Example 19 includes the method of any of Examples 14-18, wherein each RU is selected as the transmit-mode RU during exactly one measurement iteration in a timing correction iteration.

Example 20 includes the method of any of Examples 14-19, wherein each receive-mode RU determines a frame or symbol boundary difference by correlating the received known pattern signal with a re-generated known pattern signal.

Example 21 includes the method of any of Examples 15-20, wherein during each measurement iteration, each receive-mode RU determines a power level of the received known pattern signal.

Example 22 includes the method of Example 21, wherein following the at least one measurement iteration, a propagation delay is determined for each frame or symbol boundary difference based on the power levels.

Example 23 includes the method of any of Examples 15-22, wherein each timing offset based on a respective propagation delay and a respective frame or symbol boundary difference.

Example 24 includes the method of any of Examples 15-23, wherein the common alignment point is determined by: mapping each timing offset to bins in a histogram; and selecting a bin with the most timing offsets as the common alignment point.

Example 25 includes the method of Example 24, wherein, when the centralized unit does not act as a master clock, the further adjusting the common alignment point to offset a timing difference between the centralized unit and the master clock.

Example 26 includes the method of any of Examples 15-25, wherein the common alignment point is determined for all the plurality of RUs, based on the timing offsets, using reports from at least some of the plurality of RUs.

The invention claimed is:

1. A distributed radio access network (RAN), comprising:
 a plurality of remote units (RUs), each being configured to exchange radio frequency (RF) signals with at least one user equipment (UE); and
 a centralized unit communicatively coupled to the plurality of RUs via a fronthaul network;
 wherein, during each of at least one measurement iteration:
  one of the plurality of RUs is selected as a transmit-mode RU and all other of the plurality of RUs are in receive-mode;
  the transmit mode-RU transmits a known pattern signal to the receive-mode RUs; and
  a frame or symbol boundary difference is determined between when the transmit-mode RU transmitted the known pattern signal according to its clock and when the respective receive-mode RU received the known pattern signal according to its clock; and
 wherein, following the at least one measurement iteration:
  the centralized unit determines a respective timing offset, indicating a timing difference between two of the plurality of RUs, based on each frame or symbol boundary difference.

2. The distributed RAN of claim 1, wherein, following the at least one measurement iteration:
 the centralized unit determines a common alignment point for the RUs based on the timing offsets; and
 each RU's timing is adjusted to align with the common alignment point.

3. The distributed RAN of claim 1, wherein the centralized unit is a Distributed Unit or a Central Unit configured to operate in a Third Generation Partnership Project Fifth Generation communication system.

4. The distributed RAN of claim 1, wherein the centralized unit is a baseband controller configured to operate in a Third Generation Partnership Project Long Term Evolution communication system.

5. The distributed RAN of claim 1, wherein the frame or symbol boundary difference is determined, during each of the at least one measurement iteration, at each receive-mode RU.

6. The distributed RAN of claim 1, wherein each RU is selected as the transmit-mode RU during exactly one measurement iteration in a timing correction iteration.

7. The distributed RAN of claim 1, wherein each receive-mode RU determines a frame or symbol boundary difference by correlating the received known pattern signal with a re-generated known pattern signal.

8. The distributed RAN of claim 2, wherein during each measurement iteration, each receive-mode RU determines a power level of the received known pattern signal.

9. The distributed RAN of claim 8, wherein following the at least one measurement iteration, the central unit determines a propagation delay for each frame or symbol boundary difference based on the power levels.

10. The distributed RAN of claim 2, wherein the centralized unit determines each timing offset based on a respective propagation delay and a respective frame or symbol boundary difference.

11. The distributed RAN of claim 2, wherein the centralized unit determines the common alignment point by:
mapping each timing offset to bins in a histogram; and
selecting a bin with the most timing offsets as the common alignment point.

12. The distributed RAN of claim 11, wherein, when the centralized unit does not act as a master clock, the centralized unit further adjusts the common alignment point to offset a timing difference between the centralized unit and the master clock.

13. The distributed RAN of claim 2, wherein the centralized unit estimates the common alignment point for all the plurality of RUs, based on the timing offsets, using reports from at least some of the plurality of RUs.

14. A method performed by a distributed radio access network (RAN), the method comprising:
during each of at least one measurement iteration:
selecting one of a plurality of radio units (RUs) as a transmit-mode RU and all other of the plurality of RUs as receive-mode RUs, wherein the plurality of RUs are communicatively coupled to a centralized unit in the distributed RAN;
transmitting, from the transmit mode-RU, a known pattern signal to the receive-mode RUs; and
determining a frame or symbol boundary difference between when the transmit-mode RU transmitted the known pattern signal according to its clock and when the respective receive-mode RU received the known pattern signal according to its clock
following the at least one measurement iteration:
determining a respective timing offset, indicating a timing difference between two of the plurality of RUs, based on each frame or symbol boundary difference.

15. The method of claim 14, further comprising, following the at least one measurement iteration:
determining a common alignment point for the RUs based on the timing offsets; and
adjusting each RU's timing to align with the common alignment point.

16. The method of claim 14, wherein the centralized unit is a Distributed Unit or a Central Unit configured to operate in a Third Generation Partnership Project Fifth Generation communication system.

17. The method of claim 14, wherein the determining the frame or symbol boundary difference, during each of the at least one measurement iteration, is performed at each receive-mode RU.

18. The method of claim 14, wherein the centralized unit is a centralized distribution unit in a distributed antenna system.

19. The method of claim 14, wherein each RU is selected as the transmit-mode RU during exactly one measurement iteration in a timing correction iteration.

20. The method of claim 14, wherein each receive-mode RU determines a frame or symbol boundary difference by correlating the received known pattern signal with a re-generated known pattern signal.

21. The method of claim 15, wherein during each measurement iteration, each receive-mode RU determines a power level of the received known pattern signal.

22. The method of claim 21, wherein following the at least one measurement iteration, a propagation delay is determined for each frame or symbol boundary difference based on the power levels.

23. The method of claim 15, wherein each timing offset based on a respective propagation delay and a respective frame or symbol boundary difference.

24. The method of claim 15, wherein the common alignment point is determined by:
mapping each timing offset to bins in a histogram; and
selecting a bin with the most timing offsets as the common alignment point.

25. The method of claim 24, wherein, when the centralized unit does not act as a master clock, the further adjusting the common alignment point to offset a timing difference between the centralized unit and the master clock.

26. The method of claim 15, wherein the common alignment point is determined for all the plurality of RUs, based on the timing offsets, using reports from at least some of the plurality of RUs.

* * * * *